United States Patent
Obata et al.

(10) Patent No.: US 6,625,529 B2
(45) Date of Patent: Sep. 23, 2003

(54) APPARATUS FOR CONTROLLING STEERING ANGLES OF FRONT REAR WHEELS OF VEHICLE

(75) Inventors: Takeaki Obata, Kanagawa-ken (JP); Yoshitaka Deguchi, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/167,577

(22) Filed: Jun. 13, 2002

(65) Prior Publication Data
US 2002/0198644 A1 Dec. 26, 2002

(30) Foreign Application Priority Data
Jun. 14, 2001 (JP) ......................... 2001-179544

(51) Int. Cl.$^7$ .......................... G06F 165/00; G01C 21/36
(52) U.S. Cl. .......................... 701/41; 180/6.24; 180/6.6; 180/9.38; 180/253; 180/408; 180/431
(58) Field of Search ............................. 701/41, 23, 301, 701/37, 80, 208, 205, 26; 180/445, 411, 443, 412, 168, 169, 6.24, 6.6, 9.38, 253, 408, 431; 340/988, 990, 995; 342/357.01, 357.13, 357.02

(56) References Cited
U.S. PATENT DOCUMENTS 6,289,278 B1 * 9/2001 Endo et al. ................. 701/208
6,437,731 B1 * 8/2002 Henrio et al. ............... 342/165
6,480,768 B1 * 11/2002 Torii ............................ 701/23
2001/0016798 A1 * 8/2001 Kodaka et al. ............. 701/301
2002/0019697 A1 * 2/2002 Cong et al. ................. 701/207

* cited by examiner

Primary Examiner—Thomas G. Black
Assistant Examiner—Tuan C To
(74) Attorney, Agent, or Firm—McDermott, Will & Emery

(57) ABSTRACT

A control apparatus comprises a target steering angle operation unit for operating target steering angles of front wheels and rear wheels, a steering increase/steering return determination unit for determining as to whether steering wheel manipulation is in an increasing state or in a return state, a target rotation center azimuth operation unit for operating a target rotation center azimuth so that a rotation center azimuth θ is decreased in a case of steering increase and a rotation center azimuth θ is increased in a case of steering return, a vehicle behavior estimation unit for estimating a vehicle behavior based on the target rotation center azimuth, a corrected target rotation center azimuth operation unit for operating a corrected target rotation center azimuth so that the vehicle behavior does not exceed a specified value, and a corrected target steering angle operation unit for operating a corrected target steering angle realizing the corrected target rotation center azimuth.

6 Claims, 23 Drawing Sheets

MANIPULATED VARIABLE OF STEERING WHEEL [deg]

ROTATION CENTER AZIMUTH [deg]

VEHICLE TRAVELING DIRECTION [deg]

VARIABLE OF VEHICLE TRAVELING DIRECTION [deg/s]

LATERAL ACCELERATION [m/s2]

TIME [SECOND]

MANIPULATED VARIABLE OF STEERING WHEEL [deg]

ROTATION CENTER AZIMUTH [deg]

VEHICLE TRAVELING DIRECTION [deg]

VARIABLE OF VEHICLE TRAVELING DIRECTION [deg/s]

LATERAL ACCELERATION [m/s2]

TIME [SECOND]

MANIPULATED VARIABLE OF STEERING WHEEL [deg]

ROTATION CENTER AZIMUTH [deg]

VEHICLE TRAVELING DIRECTION [deg]

VARIABLE OF VEHICLE TRAVELING DIRECTION [deg/s]

LATERAL ACCELERATION [m/s2]

TIME [SECOND]

MANIPULATED VARIABLE OF STEERING WHEEL [deg]

ROTATION CENTER AZIMUTH [deg]

VEHICLE TRAVELING DIRECTION [deg]

VARIABLE OF VEHICLE TRAVELING DIRECTION [deg/s]

LATERAL ACCELERATION [m/s2]

TIME [SECOND]

APPARATUS FOR CONTROLLING STEERING ANGLES OF FRONT REAR WHEELS OF VEHICLE

BACKGROUND OF THE INVENTION

1. Field of the Invention

The present invention relates to an apparatus for controlling steering angles of front and rear wheels of a vehicle.

2. Description of the Related Art

As a steering mode of a four-wheeler, a front wheel steering mode of giving steering angles only to front wheels is generally adopted. However, according to a front/rear wheel (four-wheel) steering mode of giving steering angles also to rear wheels, improvements of drivability and stability can be made, which include reduction of the minimum turning radius and stabilization of a cornering attitude at an intermediate high speed.

In the front/rear wheel steering mode, there is a mechanical transmission mode, in which steering systems of front and rear wheels are mechanically coupled to each other, and there is a mode realized in a steering angle control apparatus for front and rear wheels of a vehicle, in which the steering systems of the front and rear wheels are not mechanically coupled to the steering wheel, and adjustment can be made for steering angles of the front and rear wheels independently with respect to a manipulated variable of the steering wheel. In this apparatus, a method is conceived readily, which manipulates the steering wheel so that the steering angles of the front and rear wheels can be changed by an equal amount in a phase reverse to each other in order to reduce the minimum turning radius of the vehicle.

However, in such an apparatus, the vehicle has behaved such that a part thereof is greatly swung outward when the vehicle is parked parallel in a forward motion or when the vehicle is turned.

SUMMARY OF THE INVENTION

In order to solve the foregoing problem, the following method of suppressing a large outward swing of a part of the vehicle is conceived. Specifically, when steering angles of front and rear wheels of the vehicle are adjusted so as to realize target steering angles of the front and rear wheels, a reference steering angle in the case where a manipulated variable of a steering wheel is maintained constant is operated in response to the manipulated variable of the steering wheel, determination is made as to whether steering is in an increase state where a direction of steering wheel manipulation and a direction changed thereby coincide with each other or in a return state where the direction of steering wheel manipulation and a direction changed thereby contradict each other, and when the determination is made that the steering is in the increase state, the reference steering angle is corrected so that an azimuth θ to a rotation center (hereinafter referred to as a "rotation center azimuth") can be reduced, and is set as the target steering angle, and when the determination is made that the steering is in the return state, the reference steering angle is corrected so that the rotation center azimuth θ can be increased, and is set as the target steering angle.

However, since the direction changed by the manipulated variable of the steering wheel and a traveling direction of the vehicle are different from each other, in some cases, a feeling of wrongness that the traveling direction of the vehicle is difficult to be manipulated is given to a driver, or ride comfort of the driver and a passenger is deteriorated by a large lateral acceleration applied to the vehicle.

For example, such a problem is sometimes caused in parking the vehicle parallel in a forward motion. Now, description will be made for a point of this problem based on simulation results shown in FIGS. 19A to 24.

FIGS. 19A to 19E are time charts in the case of carrying out the parallel parking in the forward motion by steering only the front wheels, each chart showing a change as below. FIG. 19A is a chart of the manipulated variable of the steering wheel, FIG. 19B is a chart of the rotation center azimuth, FIG. 19C is a chart of the vehicle traveling direction, FIG. 19D is a chart of the variable of the vehicle traveling direction, and FIG. 19E is a chart of the change of the lateral acceleration. Here, when the manipulated variable of the steering wheel is a positive value, manipulation to the left direction with respect to the neutral position is shown, and when the manipulated variable is a negative value, manipulation to the right direction with respect to the neutral position is shown. Moreover, as shown in FIG. 20, the vehicle traveling direction is set at an angle formed by a traveling direction of a reference point on the vehicle and an axis of abscissas of FIG. 20, and a left-hand (counterclockwise) direction is defined as positive. Here, the reference point on the vehicle is set at a bisection point of a segment connecting a bisection point of a front axle and a bisection point of a rear axle, that is, a center of the four wheels. The lateral acceleration is defined as positive when it is applied to the right direction with respect to the front of the vehicle, and is defined as negative when it is applied to the left direction with respect thereto.

FIG. 20 is a view showing an orbit of the vehicle for each second in the simulation of the front wheel steering, which is shown in FIGS. 19A to 19E.

FIG. 21 is a view showing an orbit from time t1 to time t2 for each second in the orbit of the vehicle in the simulation of the front wheel steering, which is shown in FIGS. 19A to 19E.

Meanwhile, steering control for correcting the target steering angle is carried out so as to correct the rotation center azimuth θ in response to the steering increase/steering return state, the steering control being carried out with respect to the manipulated variable of the steering wheel, which is equal to the simulation shown in FIGS. 19A to 19E. FIGS. 22A to 22E are diagrams showing the following respective values in this case. FIG. 22A is a diagram showing the manipulated variable of the steering wheel, the diagram being the same as the chart of FIG. 19A. FIG. 22B is a diagram showing a rotation center azimuth, FIG. 22C is a diagram showing a vehicle traveling direction, FIG. 22D is a diagram showing a variable of the vehicle traveling direction, and FIG. 22E is a chart showing a change of a lateral acceleration.

FIG. 23 is a diagram showing an orbit of the vehicle in the simulation of the front/rear wheel steering, which is shown in FIGS. 22A to 22E, for each second.

FIG. 24 is a diagram showing an orbit from the time t1 to the time t2 for each second in the orbit of the vehicle in the simulation of the front/rear wheel steering, which is shown in FIGS. 22A to 22E.

When a comparison is made between the vehicle traveling direction in the front wheel steering shown in FIG. 19C and the vehicle traveling direction in the front/rear wheel steering shown in FIG. 22C, it is understood that the vehicle traveling directions in the front wheel steering and the front/rear wheel steering are greatly different from each other in sections from the time t1 to the time t2 and from time t3 to time t4. Moreover, when a comparison is made between the vehicle orbit in the front wheel steering shown in FIG. 21 and the vehicle orbit of the front/rear wheel steering shown in FIG. 24, it is understood that, in the section from the time t1 to the time t2 while the manipulated variable of the steering wheel is changed to the right direction, the vehicle travels in the left direction in the front/rear wheel steering, whereas the vehicle travels in an approximately constant direction in the front wheel steering.

Hence, in some cases, the vehicle traveling direction does not coincide with the direction where the manipulated variable of the steering wheel is changed, due to the above-described phenomena, so that the feeling of wrongness that the vehicle traveling direction is difficult to be controlled is given to the driver.

Furthermore, when a comparison is made between FIG. 19D showing the variable of the vehicle traveling direction in the front wheel steering and FIG. 22D showing the variable of the vehicle traveling direction in the front/rear wheel steering, it is understood that very large changes are caused at the time t1 and the time t3 in the front/rear wheel steering. Moreover, when a comparison is made between FIG. 19E showing the lateral acceleration in the front wheel steering and FIG. 22E showing the lateral acceleration in the front/rear wheel steering, it is understood that very large lateral accelerations are applied to the vehicle at the time t1 and the time t3 in the front/rear wheel steering. Hence, the ride comfort of the driver and the passenger is sometimes deteriorated due to the above-described phenomena.

The present invention has an object to provide an apparatus for controlling steering angles of front and rear wheels of a vehicle, which is capable of decreasing the outward swing of the vehicle orbit during parallel-parking in the forward motion and vehicle turning while suppressing the feeling of wrongness that the traveling direction of a front/rear wheel steering vehicle is difficult to be controlled and the deterioration of the ride comfort due to the large lateral acceleration.

In order to achieve the foregoing object, a first aspect of the present invention is an apparatus for controlling steering angles of front and rear wheels of a vehicle, in which the steering angles of the front and rear wheels are controlled independently, the apparatus including: a target steering angle operation unit operating target steering angles of the front and rear wheels based on a manipulated variable of a steering wheel; a steering increase/steering return determination unit determining as to whether steering is in an increase state where a direction of steering wheel manipulation and a direction changed thereby coincide with each other or in a return state where the direction of steering wheel manipulation and the direction changed thereby contradict each other; a target rotation center azimuth operation unit operating a target rotation center azimuth so as to reduce a rotation center azimuth when the steering increase/steering return determination unit determines the steering increase state and operating the target rotation center azimuth so as to increase the rotation center azimuth when the steering increase/steering return determination unit determines the steering return state; a vehicle behavior estimation unit estimating a vehicle behavior based on the target rotation center azimuth; a corrected target rotation center azimuth operation unit operating a corrected target rotation center azimuth by limiting the target rotation center azimuth so that the estimated vehicle behavior cannot exceed a specified range; a corrected target steering angle operation unit operating a corrected target steering angle by correcting the target steering angle so as to realize the corrected target rotation center azimuth; and a steering angle adjustment unit adjusting each of the steering angles of the front and rear wheels of the vehicle so as to realize the corrected target steering angle.

According to the above-described constitution, the outward swing of the vehicle orbit during the parallel-parking in the forward motion and the vehicle turning can be decreased while preventing the feeling of wrongness that the traveling direction of the front/rear wheel steering vehicle is difficult to be controlled and the deterioration of the ride comfort.

Next, definitions of terms in the present invention will be clarified with reference to FIG. 13.

Reference Point on Vehicle (P)

An optional point fixed on a vehicle. Usually, a bisection point of a segment connecting a bisection point of a front axle and a bisection point of a rear axle is selected as the reference point. The center point of gravity of the vehicle may be selected as the reference point.

Vehicle Fixed Coordinate

A coordinate system fixed on a vehicle, in which an origin, an x-axis and a y-axis are defined. Hereinafter, as shown in FIG. 13, the reference point P on the vehicle is taken as the origin, the x-axis is set toward the front of the vehicle, and the y-axis is set toward the side of the vehicle. Here, with regard to the y-axis, a turning direction of the vehicle is defined as positive. In FIG. 13, since the vehicle turns to the right, the right side of the vehicle is defined as positive. When the vehicle turns to the left, the left side of the vehicle is defined as positive.

Attitude Angle

An angle β formed by a direction toward which the reference point P on the vehicle travels and the front of the vehicle (x-axis in FIG. 13), and a left-hand (counterclockwise) direction is defined as positive.

Steering Angle

Angles formed by the x-axis and respective wheels in FIG. 13. A steering angle of a front right wheel is denoted as δfr, a steering angle of a front left wheel is denoted as δfl, a steering angle of a rear left wheel is denoted as δrl, and a steering angle of a rear right wheel is denoted as δrr.

Rotation Center

A point on the vehicle fixed coordinate, which will be the center of turning when the vehicle turns with the steering angles of the front and rear wheels of the vehicle fixed constant.

Radius from Rotation Center

A distance R between the reference point P on the vehicle and the rotation center.

Rotation Center Azimuth

An angle formed by a line connecting the reference point P on the vehicle and the rotation center and a line extended from the reference point P on the vehicle to a lateral direction (parallel to the y-axis) of the vehicle. A rotation angle to the vehicle traveling direction is defined as positive. When the vehicle turns to the right, the counterclockwise rotation is positive. When the vehicle turns to the left, the clockwise rotation is positive.

Steering Increase

To change a manipulated variable of a steering wheel so that a turning radius of the vehicle can be reduced. Further steering to the right when turning the steering wheel to the right, and on the contrary, further steering to the left when turning the steering wheel to the left, are referred to as the steering increase.

Steering Return

To change the manipulated variable of steering wheel so that the turning radius of the vehicle is increased. Returning of the steering to the left when turning the steering wheel to the right, and on the contrary, returning of the steering to the right when turning the steering wheel to the left, are referred to as the steering return.

DESCRIPTION OF THE PREFERRED EMBODIMENTS

Next, description will be made in detail for embodiments of the present invention with reference to the drawings.

Figure 1:
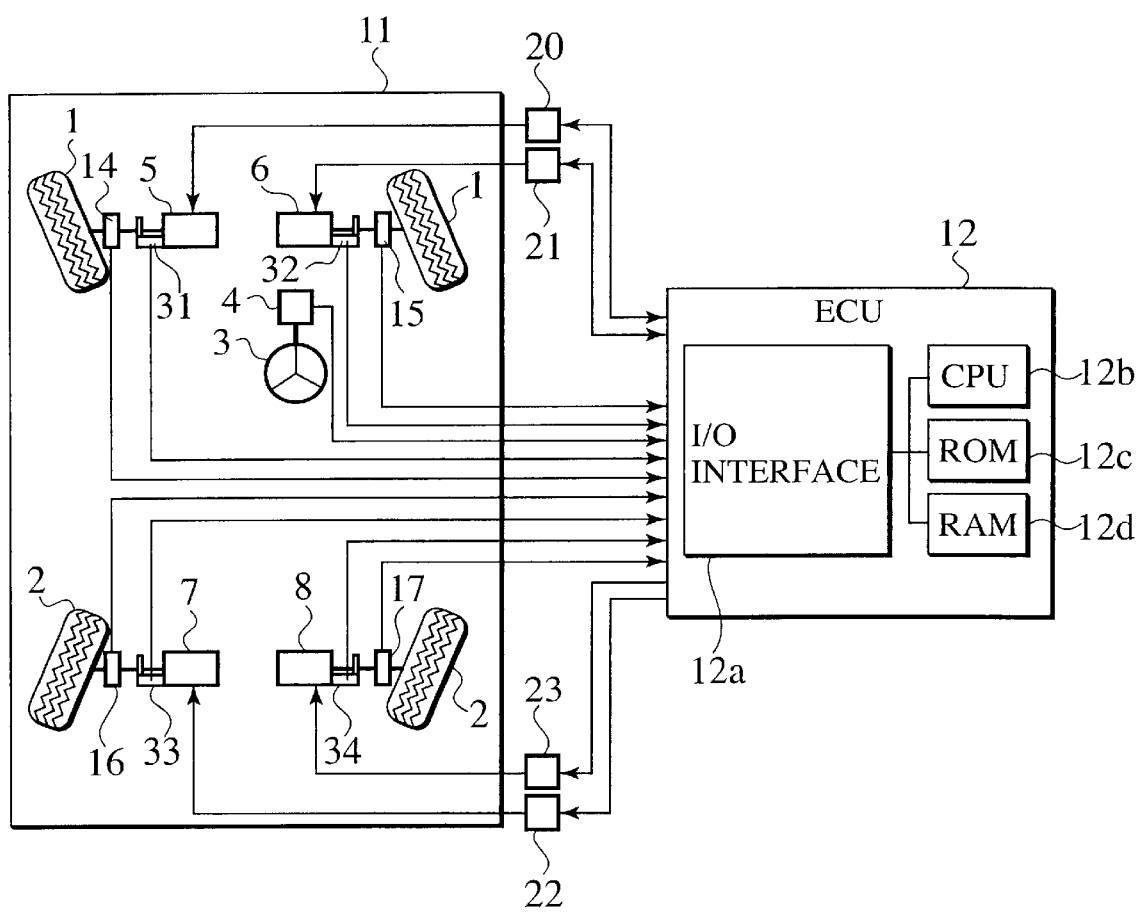
FIG. 1 is a system constitutional view explaining an embodiment of a vehicle to which an apparatus for controlling steering angles of front and rear wheels of a vehicle according to the present invention is applied.

FIG. 1 is a view showing a constitution of a vehicle for which one embodiment of an apparatus for controlling steering angles of front and rear wheels according to the present invention is adopted. In FIG. 1, a vehicle 11 includes front wheels 1, rear wheels 2, a steering wheel 3 manipulated by a driver and a steering angle sensor 4 detecting a steering angle of the steering wheel. The steering angle sensor 4 detects a rotation amount of a column shaft by use of, for example, a sensor of an encoder system, and then sends the detected rotation amount to an apparatus for controlling steering angles of front and rear wheels, that is, an electronic control unit (hereinafter, abbreviated as ECU) 12.

Front wheel steering actuators 5 and 6 for steering the front wheels 1 and rear wheel steering actuators 7 and 8 for steering the rear wheels 2 have DC motors, respectively. Rotational motions of the motors are converted into rightand-left motions of steering rack via worm gears, and a moving stroke of the steering rack is adjusted, whereby the steering angles of the front right/left and rear right/left wheels can be adjusted. Here, the motors are not limited to the DC motors and may be induction motors, switched reluctance motors or the like. Alternatively, the motors may be linear motors capable of directly adjusting the moving stroke of the steering rack.

Moreover, drive circuits 20 to 23 for driving the steering actuators 5 to 8 respectively are the ones driving the motors for steering the respective wheels upon receiving steering angle command values from the ECU 12. Each of the drive circuits is constituted of an H-bridge capable of controlling normal/reverse rotation of the motor. Current feedback of the DC motor is made so as to realize a motor current commanded from the ECU 12 to be described later.

Rack stroke sensors 31 to 34 are potentiometric rack stroke sensors for detecting the steering rack moving strokes of the respective front right/left and rear right/left wheels. Moreover, vehicle speed sensors 14 to 17 are sensors for detecting rotation speeds of the respective wheels of the vehicle 11. As a usable vehicle speed sensor, there is one of a Hall IC type outputting a pulse when the gear approaches from a groove to a thread in response to rotation of the gear attached to a rotation axle of each wheel.

The ECU 12 is constituted of a control circuit (ECU) including a microcomputer as a main component, and performs input/output of a signal with the outside and a variety of operations. A CPU 12b executes the operations, and a ROM 12c stores a control program and a variety of data, which are to be described later. A RAM 12d stores information temporarily during execution of the program. An I/O interface 12a receives information from the external sensors and the like and outputs a signal for driving the external actuators. Moreover, the ECU 12 also includes therein a timer measuring a time between the pulses of each of the vehicle speed sensors 14 to 17.

Figure 2:
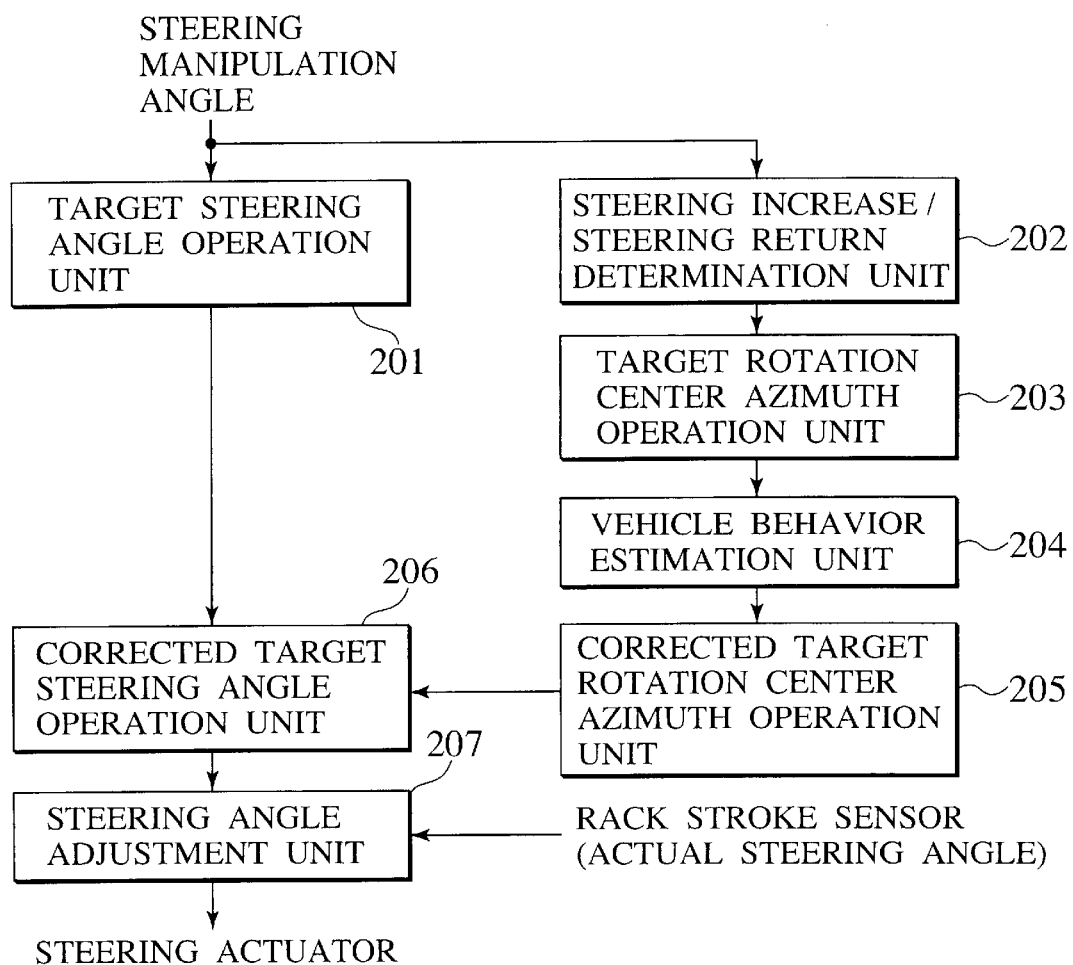
FIG. 2 is a block diagram explaining a constitution of the apparatus for controlling steering angles of front and rear wheels of the present invention.

FIG. 2 is a function block diagram explaining a constitution of the apparatus for controlling steering angles of front and rear wheels of the present invention. In FIG. 2, the apparatus for controlling steering angles of front and rear wheels includes a target steering angle operation unit 201 operating target steering angles of the front and rear wheels based on a manipulated variable of the steering wheel, a steering increase/steering return determination unit 202 determining as to whether steering is in an increase state where a direction of steering wheel manipulation and a direction changed thereby coincide with each other or in a return state where the direction of steering wheel manipulation and a direction changed thereby contradict each other, a target rotation center azimuth operation unit 203 operating a target rotation center azimuth so as to reduce a rotation center azimuth θ when the steering increase/steering return determination unit 202 determines the steering increase state and operating the target rotation center azimuth so as to increase the rotation center azimuth θ when the steering increase/steering return determination unit 202 determines the steering return state, a vehicle behavior estimation unit 204 estimating a vehicle behavior based on the operated target rotation center azimuth, a corrected target rotation center azimuth operation unit 205 operating a corrected target rotation center azimuth by limiting the target rotation center azimuth so that the estimated vehicle behavior cannot exceed a specified range, a corrected target steering angle operation unit 206 operating a corrected target steering angle by correcting the target steering angle so as to realize the corrected target rotation center azimuth, and a steering angle adjustment unit 207 adjusting each of the steering angles of the front and rear wheels of the vehicle so as to realize the corrected target steering angle.

The target steering angle operation unit 201, the steering increase/steering return determination unit 202, the target rotation center azimuth operation unit 203, the vehicle behavior estimation unit 204, the corrected target rotation center azimuth operation unit 205, the corrected target steering angle operation unit 206 and the steering angle adjustment unit 207 are realized by the ECU 12 of FIG. 1.

The vehicle behavior estimation unit 204 estimates the behavior of the vehicle based on the target rotation center azimuth operated by the target rotation center azimuth operation unit 203. Concretely, as such vehicle behavior, an angle variable of a vehicle traveling direction is enumerated in a first embodiment, a lateral acceleration of the vehicle is enumerated in a second embodiment, and a traveling direction of a reference point on the vehicle is enumerated in third and fourth embodiments.

Then, the corrected target rotation center azimuth operation unit 205 operates the corrected target rotation center azimuth by limiting the target rotation center azimuth so that the estimated vehicle behavior cannot exceed a specified range. Thus, an outward swing of a vehicle orbit during parallel-parking in a forward motion and vehicle turning can be decreased while preventing a feeling of wrongness that the traveling direction of the front/rear wheel steering vehicle is difficult to be controlled and deterioration of ride comfort.

Figure 4:
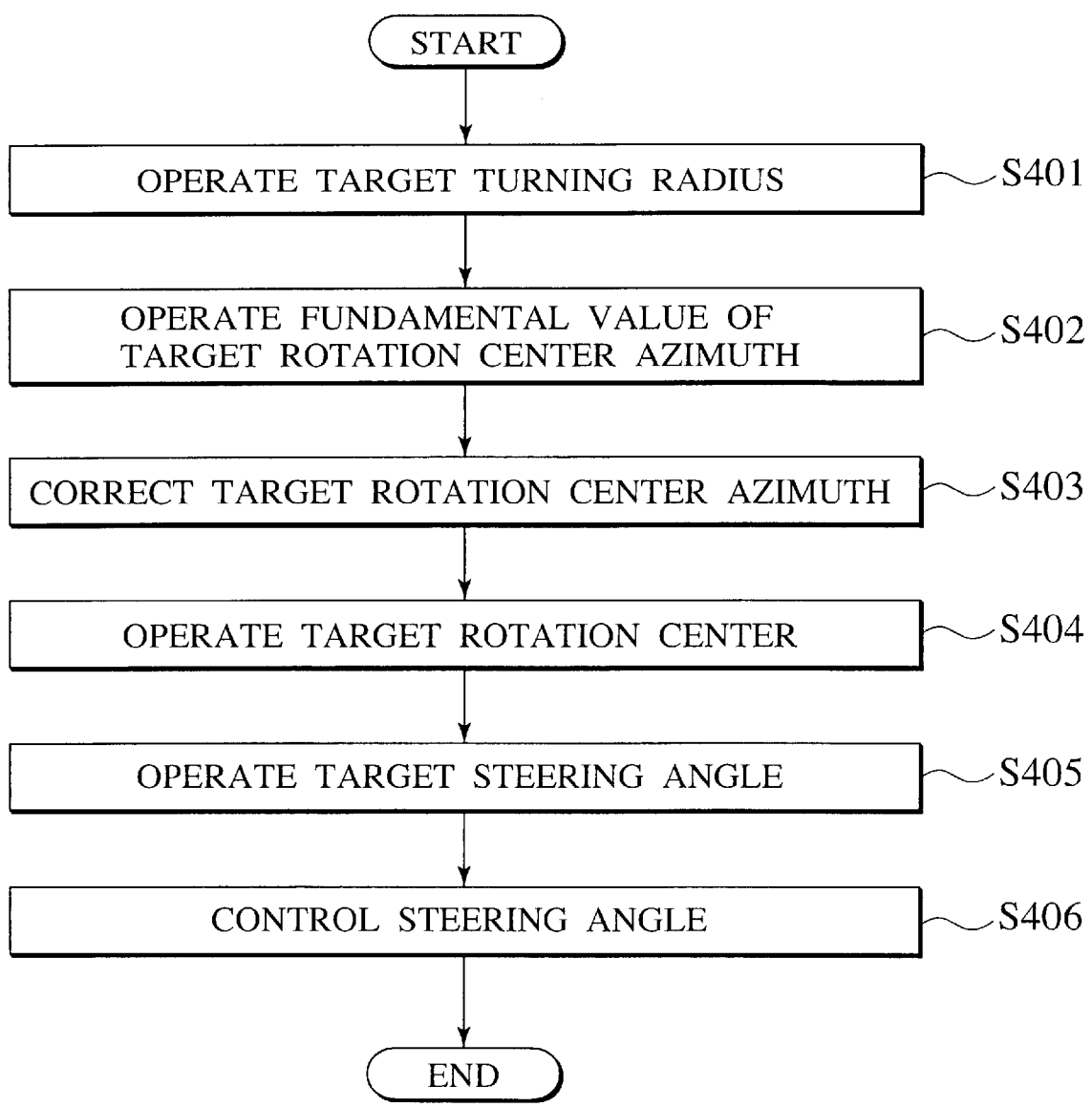
FIG. 4 is a flowchart schematically explaining processing of steering control for the front and rear wheels of the present invention.

FIG. 4 is a flowchart schematically showing an operation of the apparatus for controlling steering angles of front and rear wheels according to the present invention, and the operation is executed in a specified time cycle, for example, for every 10 [msec]. First, in Step S401, a target turning radius is operated based on the manipulated variable of the steering wheel. In Step S402, the increase/return state of the steering manipulation is determined, and in response to the increase/return state of the steering manipulation, a fundamental value θ0 of the rotation center azimuth is operated so as to decrease the rotation center azimuth in the case of the steering increase and so as to increase the rotation center azimuth θ in the case of the steering return.

In Step S403, the rotation center azimuth is corrected so that the change of the vehicle traveling direction can be a desired value. A target rotation center position is operated in Step S404, each target steering angle of the front and rear wheels is operated in Step S405, and each steering angle of the front and rear wheels is controlled in Step S406, followed by the end of the processing.

Hereinafter, description will be made in detail for contents of the processing in Steps S401 to S406. Note that, since the reference point P on the vehicle can be explained similarly wherever on the vehicle the reference point P may be plotted, an application example will be explained below taking the reference point P as the center of four wheels (intermediate point of a segment connecting front and rear tread centers).

Figure 3:
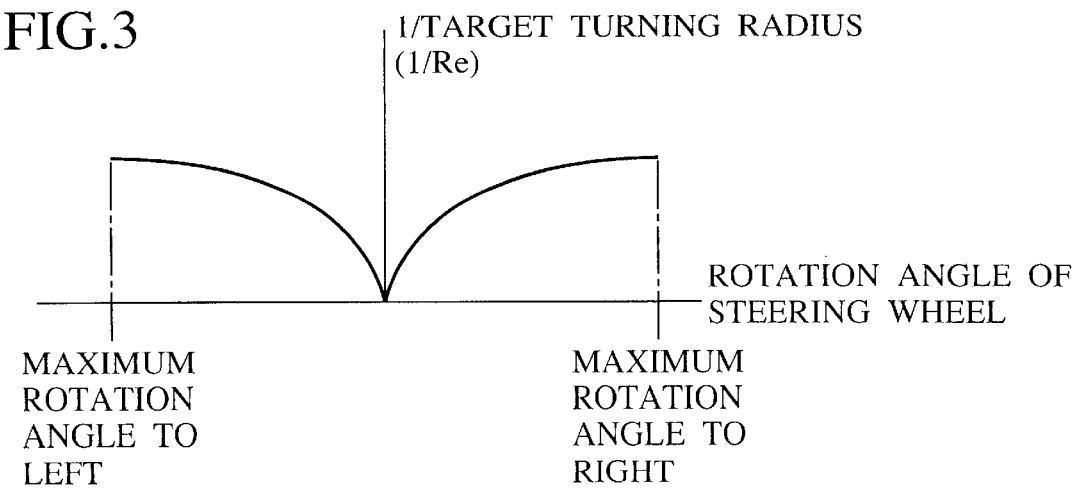
FIG. 3 is a view showing a generation example of a target turning radius for a rotation angle of a steering wheel.

In Step S401, a target turning radius Re in response to a rotation angle detection value ST of the steering wheel is operated. As shown in FIG. 3, the target turning radius Re is previously stored, in the ROM, in a form of a table for the rotation angle of the steering wheel, and the operation is performed with reference to the table.

In this case, a turning radius in a straight traveling state of the vehicle corresponds to the rotation angle of the steering wheel infinitely. Therefore, it is convenient in points of a storage constitution and calculation accuracy when a table value is inputted as an inverse number (1/Re) of the target turning radius as shown in FIG. 3. Here, the target turning radius may be made to correspond to a vehicle speed as well as the rotation angle of the steering wheel.

In Step S402, the fundamental value θ0 of the rotation center azimuth is operated in response to the increase/return of the steering wheel manipulation.

Figure 5:
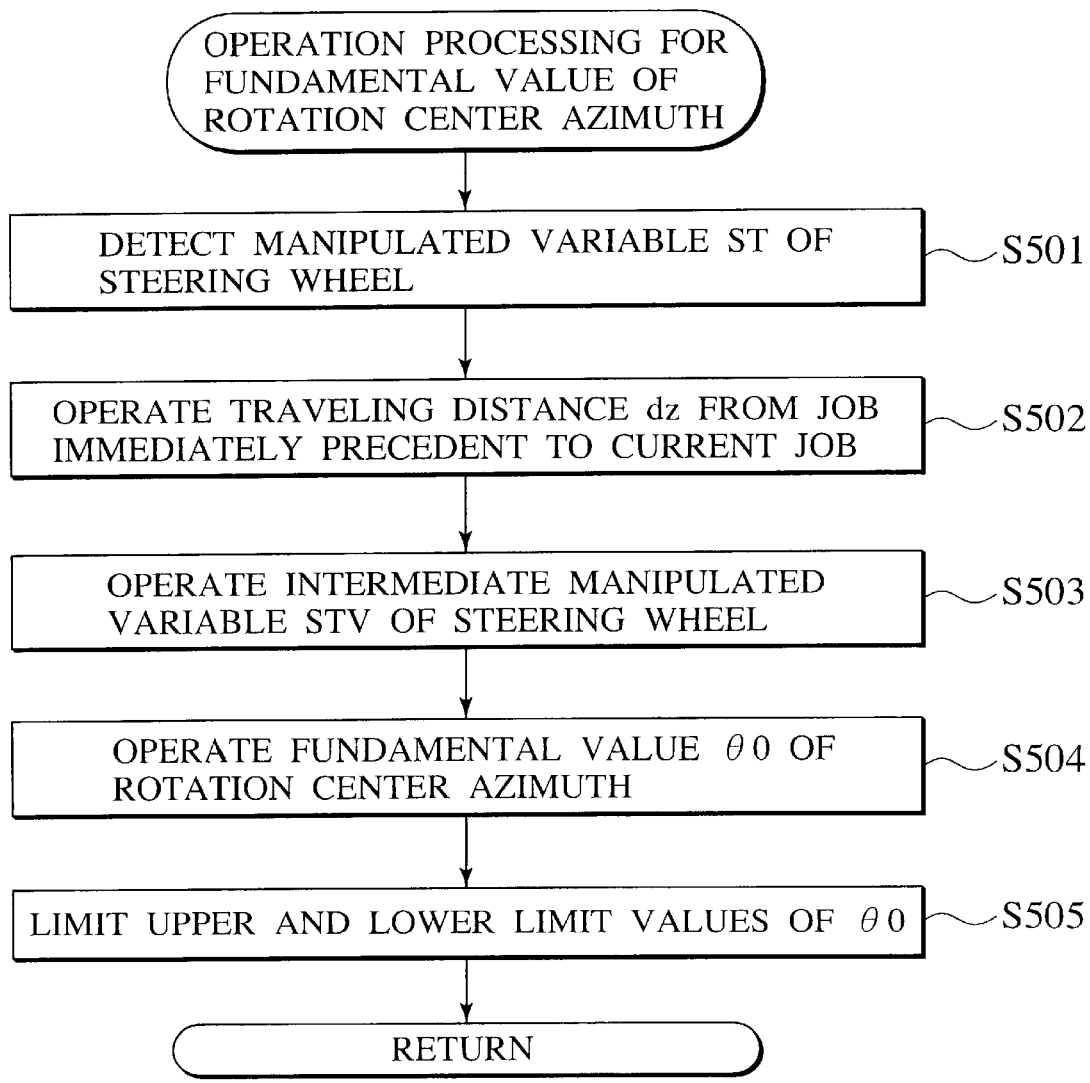
FIG. 5 is a flowchart showing an operation example for a fundamental value of a rotation center azimuth.

Hereinafter, description will be made for an operation of the fundamental value θ0 of the rotation center azimuth with reference to a flowchart of FIG. 5. In the flowchart of FIG. 5, the operation is executed in synchronization with a pulse rise of a wheel speed sensor of the front right wheel when the vehicle turns to the left, and the operation is executed in synchronization with a pulse rise of a wheel speed sensor of the front left wheel when the vehicle turns to the right or travels approximately straight.

In FIG. 5, first, in Step S501, a signal of the steering angle sensor is read, and the manipulated variable of the steering wheel ST by a driver is detected. In Step S502, a traveling distance dz of the reference point P from a "JOB" immediately precedent to the current JOB is operated.

When the traveling distance dz is obtained, a traveling distance of each wheel is previously operated. The traveling distance of each wheel is obtained in such a manner that a moving speed of each wheel is obtained by dividing a vehicle traveling distance per pulse by a pulse time interval of the vehicle speed sensor and the obtained moving speed is subjected to time integration. Alternatively, the traveling distance may be obtained by accumulating values, each of which is obtained by multiplying the number of generated pulses of the vehicle speed sensor by a wheel traveling distance per pulse.

Now, the vehicle speed sensors 14 to 17, the number of which is four in total, are equipped with the respective axles. Since the position of the reference point P is located at the center of the wheels, an average value of the traveling distances operated based on outputs of the four vehicle speed sensors is simply operated as a traveling distance z of the reference point P. The vehicle traveling distance dz for one JOB is obtained from the reference point traveling distance z thus obtained and a reference point traveling distance zold at the JOB immediately precedent to the current JOB in the following equation.

$$dz = z - zold \quad (1)$$

Here, if the reference point P is set at a position of the wheel speed sensor of the front right wheel when the vehicle turns to the left, and the reference point P is set at a position of the wheel speed sensor of the front left wheel when the vehicle turns to the right or travels approximately straight, then a value of the vehicle traveling distance dz corresponds to a distance previously determined in accordance with a pulse generation interval. Therefore, it is not necessary to perform the operation through the equation (1).

In Step S503, an intermediate manipulated variable of steering wheel STV is operated. Limited values of change rates of the intermediate manipulated variables of the steering wheel per unit traveling distance of the reference point are previously stored in the ROM in correlation with the target turning radius Re, respectively. Then, data correlated therewith is looked up, thus obtaining an STV increase rate limited value dSTVi and an STV decrease rate limited value dSTVd.

Then, STV is operated so as to coincide with the manipulated variable of the steering wheel ST in a variable range from dSTVi*dz to dSTVd*dz in response to STVz that is an STV value of the JOB immediately precedent to the current JOB. Note that, besides this application example, there is also a method for making the intermediate manipulated variable of the steering wheel STV coincide with the manipulated variable of the steering wheel ST by means of a first lag or a secondary propagation characteristic.

Moreover, there are also an operation method with a change of the manipulated variable of the steering wheel for time as STV, and also an operation method with the one, as STV, obtained by further adding a limit of the change rate for the traveling distance dz or the time to the STV obtained as described above.

In Step S504, when the rotation center azimuth fundamental value θ0 is obtained, a difference between the value of the intermediate manipulated variable of the steering wheel STV and STVz which is a STV value of the JOB immediately precedent to the current JOB is obtained in the following equation (2).

$$dSTV = STV - STVz \quad (2)$$

Here, the manipulated variable of the steering wheel corresponds to the steering increase state when dSTV is a positive value, and the manipulated variable of the steering wheel corresponds to the steering return state when dSTV is a negative value.

Figure 11:
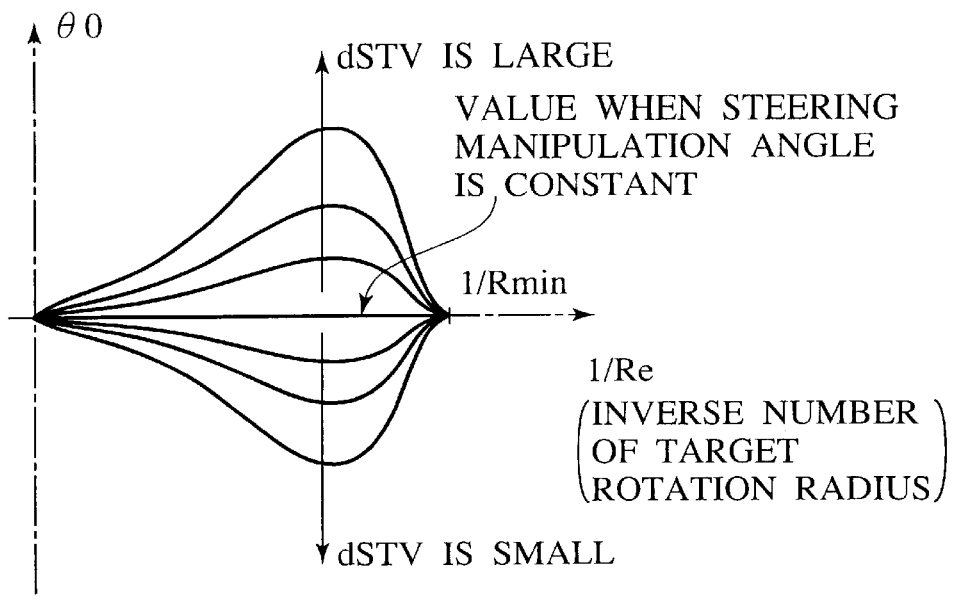
FIG. 11 is a view showing a generation example for a fundamental value of the rotation center azimuth.

Subsequently, the rotation center azimuth fundamental value θ0 correlated with the dSTV value and the target turning radius Re is decided by looking up the data previously correlated therewith. A correlation example is shown in FIG. 11. In FIG. 11, with respect to a value of the manipulated variable of the steering wheel, which is obtained when the manipulated variable (angle) of the steering wheel is constant, the rotation center azimuth fundamental value θ0 is corrected to be larger when dSTV is positive and to be smaller when dSTV is negative.

Figure 12:
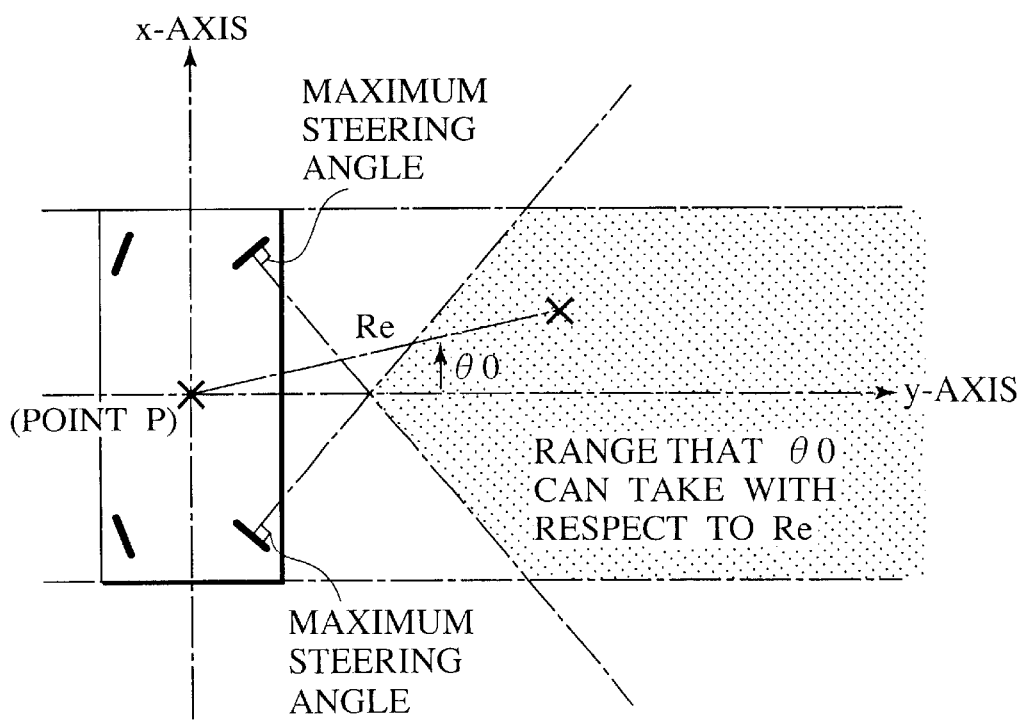
FIG. 12 is a view explaining a limit of the fundamental value of the rotation center azimuth, showing the vehicle seen from the above when the vehicle turns to the right.
Figure 13:
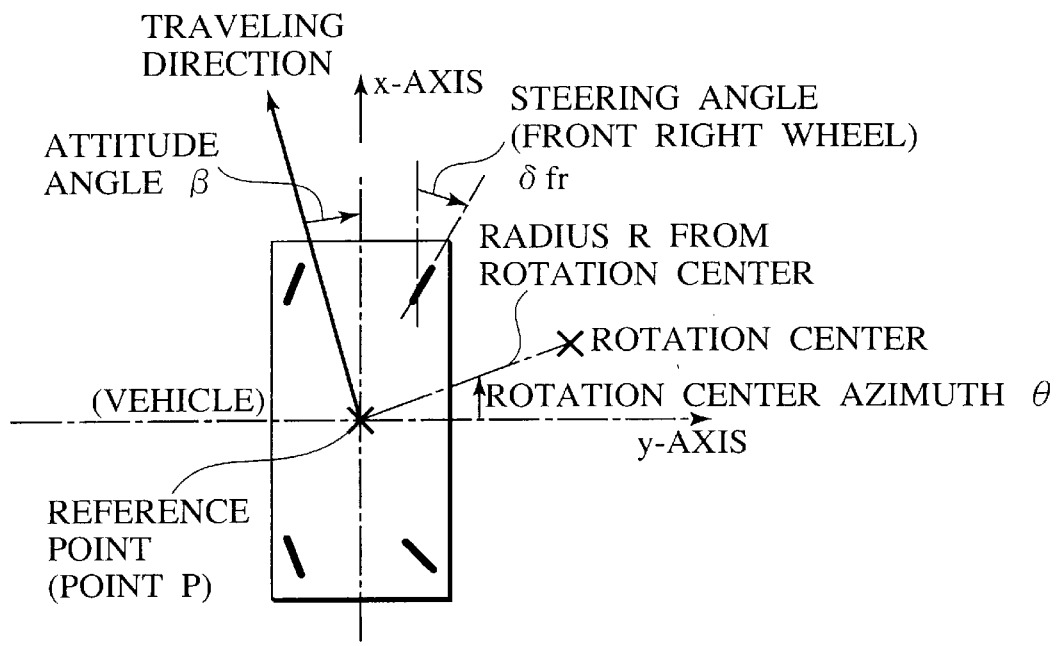
FIG. 13 is a view explaining definitions of terms for use in the present invention, showing the vehicle seen from the above when the vehicle turns to the right.

In Step S505, the rotation center azimuth fundamental value θ0 is added with a limit in response to the target turning radius Re so as to be set in a range of FIG. 12, and the operation is then returned. Relationships between upper and lower limit values of Re and θ0 are previously obtained. Such relationships are obtained by storing the values in the ROM and then looking up the same, and θ0 is limited by means of the obtained values of the relationships.

In Step S403, correction for limiting the target rotation center azimuth is made so that the vehicle behavior estimated based on the rotation center azimuth fundamental value θ0 cannot exceed a specified value.

Hereinafter, description will be made for a concrete correction method of the rotation center azimuth with reference to flowcharts of FIGS. 6 to 9.

Figure 6:
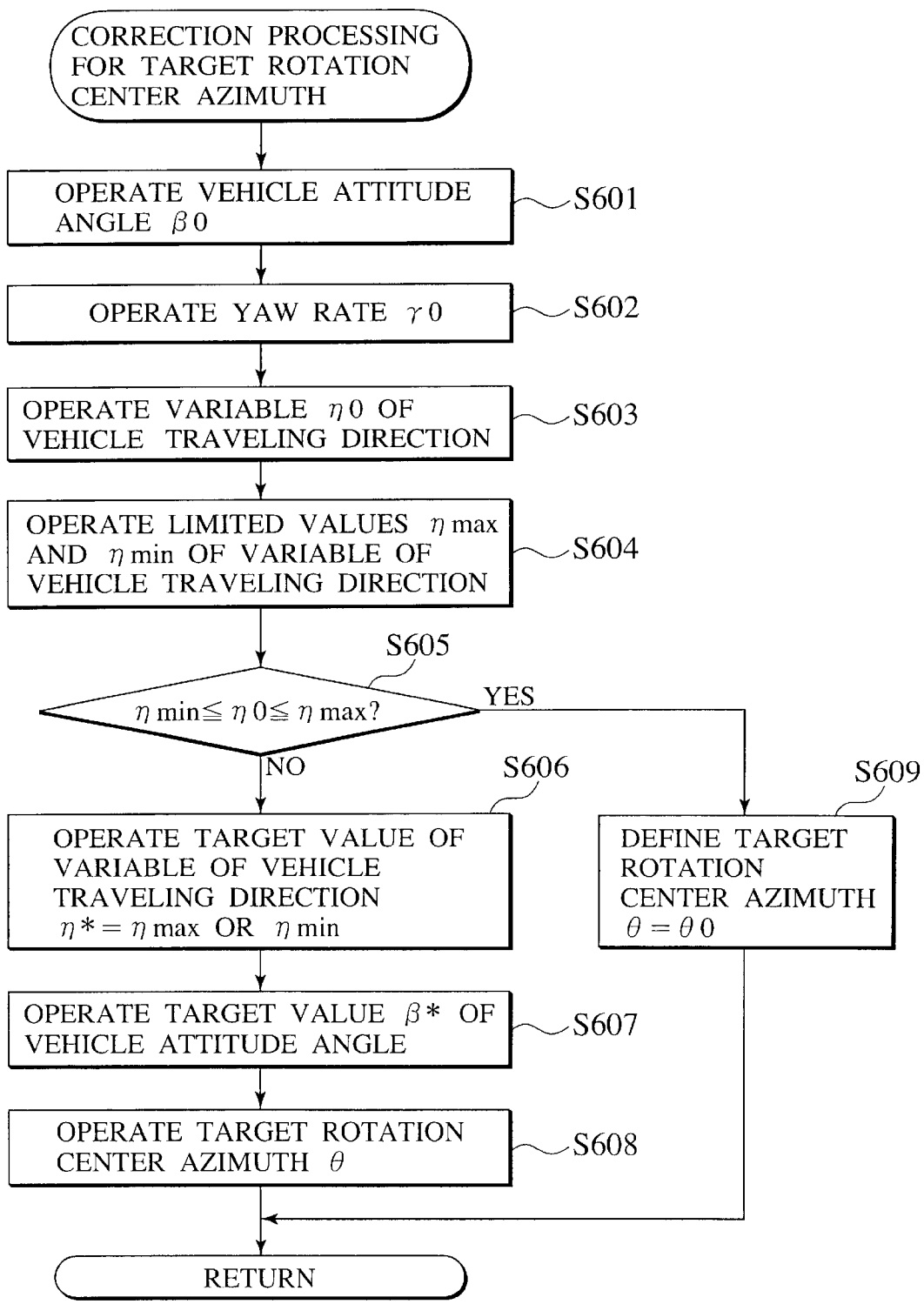
FIG. 6 is a flowchart showing a first embodiment of a correction operation for the rotation center azimuth.

The flowchart of FIG. 6 shows a first embodiment of correction of the rotation center azimuth, which is an embodiment corresponding to the invention according to claim 2 in which the angle variable of the vehicle traveling direction is limited as the vehicle behavior.

In Step S601, a vehicle attitude angle β0 when the rotation center azimuth is the fundamental value θ0 is operated by use of the equation (3).

$$\beta 0 = -\theta 0 \text{ (if } Re \geq 0)$$

$$\beta 0 = \theta 0 \text{ (if } Re < 0) \quad (3)$$

In Step S602, a yaw rate γ0 when the turning radius is the target value Re is operated by use of the equation (4), where ΔT is a control cycle, which is 0.01 [msec] in this embodiment.

$$\gamma 0 = \frac{1}{Re} \times \frac{dz}{\Delta T} \quad (4)$$

In Step S603, a variable η0 of the traveling direction of the reference point P when the rotation center azimuth is the fundamental value θ0 and the turning radius is the target value Re is operated by use of the equation (5).

$$\eta 0 = \frac{\beta 0 - \beta^*(\text{precedent value})}{\Delta T} + \gamma 0 \quad (5)$$

Figure 15:
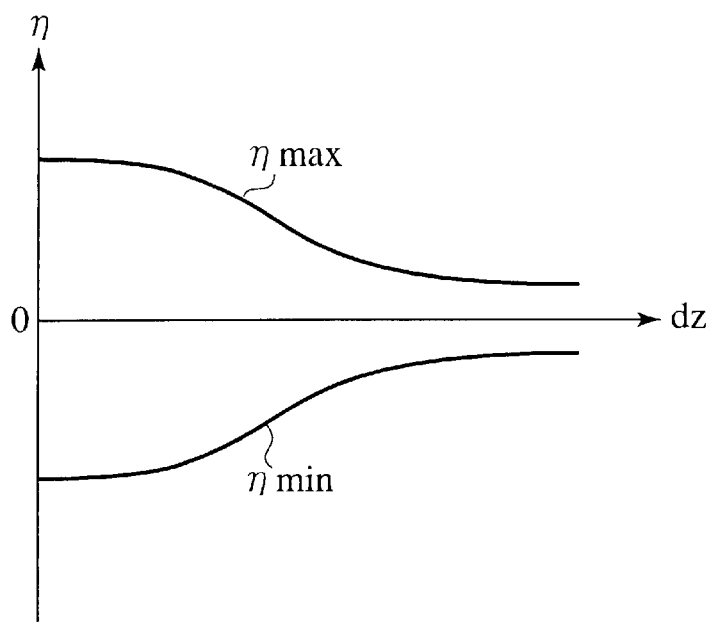
FIG. 15 is a view showing an example of generating a limit value of a variable in a vehicle traveling direction.

In Step S604, the maximum value ηmax and the minimum value ηmin are operated as the limited values of the variables of the traveling direction of the reference point P. In this operation, the maximum value ηmax and the minimum value ηmin are decided by looking up the data previously correlated with the traveling distance dz. For example, such correlation is made as shown in FIG. 15. In FIG. 15, the maximum value ηmax has a decreasing characteristic when dz is increased, and the minimum value ηmin has an increasing characteristic when dz is increased. Note that the maximum value ηmax and minimum value ηmin of the traveling direction variable may be corrected in response to the turning radius Re for performing the operation.

In Step S605, magnitude relationships between η0 and ηmax and between η0 and ηmin are determined. When η0 is located between the maximum value ηmax and the minimum value ηmin, the operation proceeds to Step S609. When η0 is not located between the maximum value ηmax and the minimum value ηmin, the operation proceeds to Step S606.

In Step S606, a target value η* of the traveling direction variable of the reference point P is operated by use of the equation (6).

η*=ηmax (if η0>ηmax)

η*=ηmin (if η0<ηmin) (6)

In Step S607, a target value β* of the vehicle attitude angle for realizing the target value η* of the traveling direction variable is operated by use of the equation (7).

β*=(η*−γ0)×ΔT+β*(precedent value) (7)

In Step S608, the target rotation center azimuth θ is operated by use of the equation (8).

θ=−β*(if Re≧0)

θ=β*(if Re<0) (8)

In Step S609, the rotation center azimuth fundamental value θ0 is defined as the target rotation center azimuth θ.

Simulation results of the first embodiment described with reference to the flowchart of FIG. 6 are shown in time charts of FIGS. 25A to 25E. When a comparison is made between the variable of the vehicle traveling direction of FIG. 25D and the variable of the vehicle traveling direction in the simulation results of the comparative example of FIG. 22D, it is understood that, in this embodiment, the variables of the vehicle traveling direction at the time t1 and the time t3 are controlled in a specified range.

Note that, with regard to the correction of the rotation center azimuth, another correction method is conceived, in which a low-pass filter or a change rate limiter is applied for the fundamental value θ0 of the rotation center azimuth.

Figure 7:
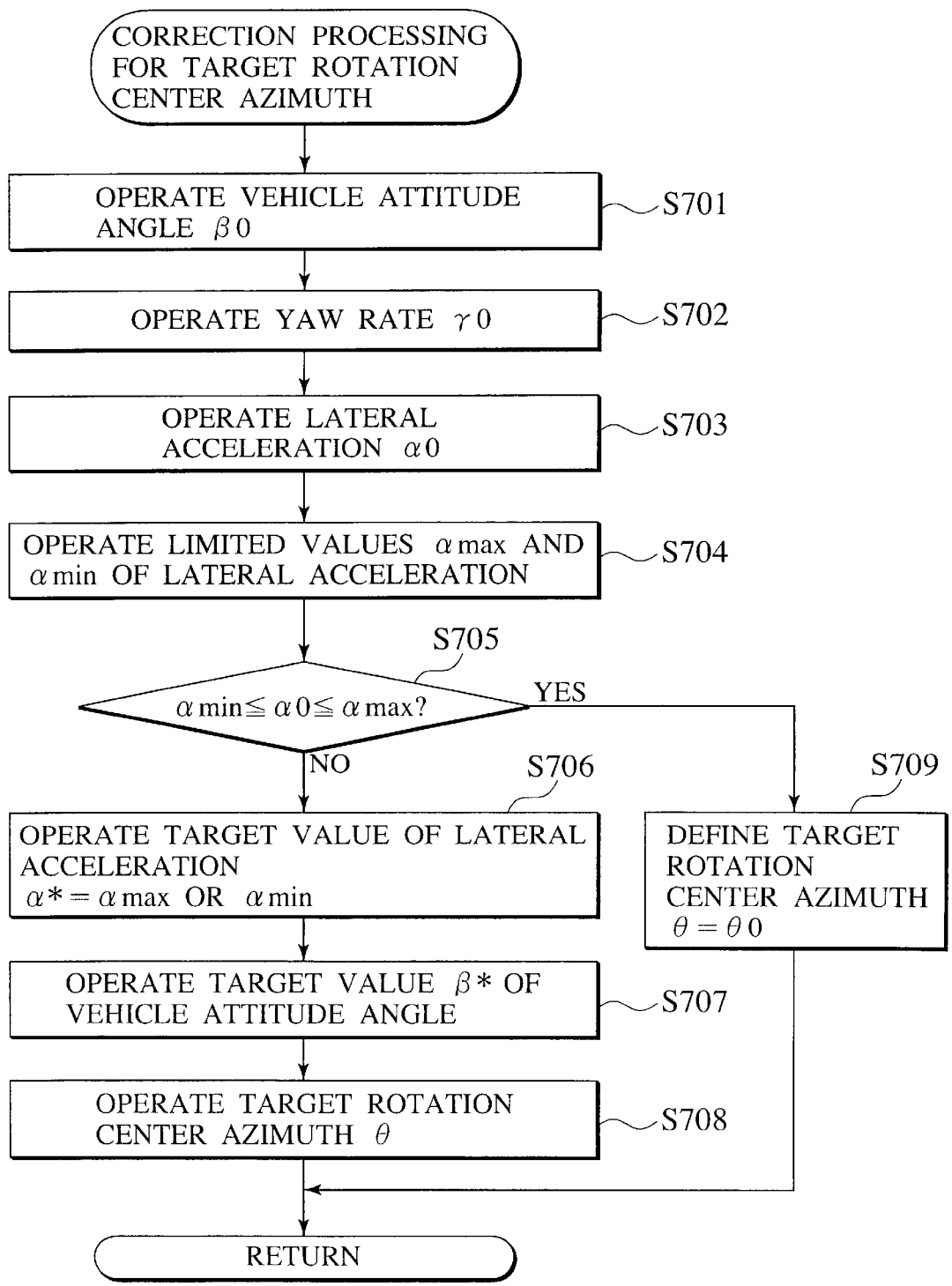
FIG. 7 is a flowchart showing a second embodiment of the correction operation for the rotation center azimuth.

A flowchart of FIG. 7 shows a second embodiment of the correction of the rotation center azimuth, which corresponds to the invention according to claim 3 in which the lateral acceleration of the vehicle is limited as the vehicle behavior.

In Step S701, the vehicle attitude angle β0 when the rotation center azimuth is the fundamental value θ0 is operated by use of the equation (3).

In Step S702, the yaw rate γ0 when the turning radius is the target value Re is operated by use of the equation (4).

In Step S703, a lateral acceleration α0 of the vehicle when the rotation center azimuth is the fundamental value θ0 and the turning radius is the target value Re is operated by use of the equation (9).

$$\alpha 0 = \frac{dz}{\Delta T} \times \cos\beta 0 \times \left(\frac{\beta 0 - \beta^*(\text{precedent value})}{\Delta T} + \gamma 0\right) \quad (9)$$

Figure 16:
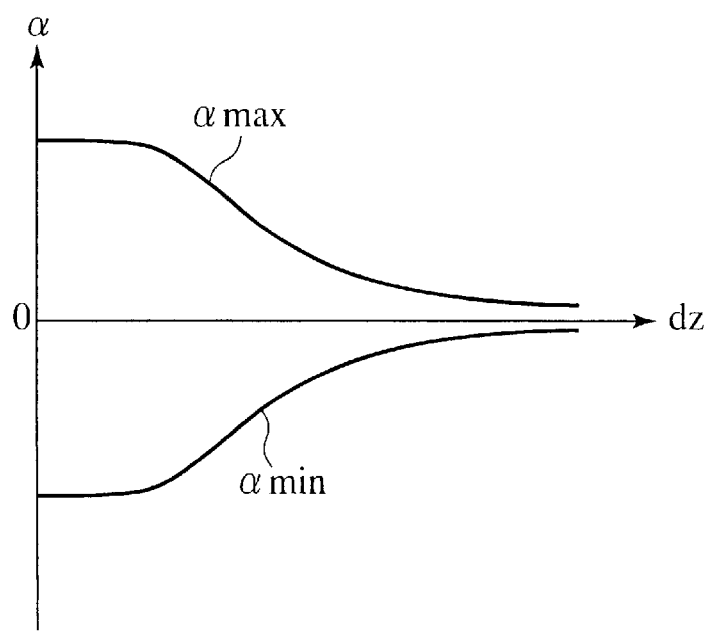
FIG. 16 is a view showing an example of generating a limit value of a lateral acceleration.

In Step S704, the maximum value αmax and the minimum value αmin are operated as the limited values of the lateral acceleration. In this operation, the maximum value αmax and the minimum value αmin are decided by looking up the data previously correlated with the traveling distance dz. This data is prepared by experimentally obtaining a threshold value of a lateral acceleration perceptible to the driver or the passenger while changing the vehicle speed. For example, such correlation is made as shown in FIG. 16. In FIG. 16, the maximum value αmax has a decreasing characteristic when dz is increased, and the minimum value αmin has an increasing characteristic when dz is increased. Note that the maximum value αmax and the minimum value αmin of the lateral acceleration may be corrected in response to the turning radius Re for performing the operation.

In Step S705, magnitude relationships between α0 and αmax and between α0 and αmin are determined. When α0 is located between the maximum value αmax and the minimum value αmin, the operation proceeds to Step S709. When α0 is not located between the maximum value αmax and the minimum value αmin, the operation proceeds to Step S706 in order to limit the lateral acceleration at the maximum value αmax or the minimum value αmin.

In Step S706, a target value α* of the lateral acceleration is operated by use of the equation (10).

α*=αmax (if α0>αmax)

α*=αmin (if α0<αmin) (10)

In Step S707, a target value β* of the vehicle attitude angle for realizing the target value α* of the lateral acceleration is operated by use of the equation (11).

$$\beta^* = \left(\alpha^* \times \frac{\Delta T}{dz} \times \frac{1}{\cos\beta^*(\text{precedent value})} - \gamma 0\right) \times \Delta T + \\ \beta^*(\text{precedent value}) \quad (11)$$

In Step S708, the rotation center azimuth θ is operated from the target value β* of the vehicle attitude angle by use of the equation (8).

In Step S709, the rotation center azimuth fundamental value θ0 is defined as the target rotation center azimuth θ.

Simulation results of the second embodiment described with reference to the flowchart of FIG. 7 are shown in time charts of FIGS. 26A to 26E. When a comparison is made between the lateral acceleration of FIG. 26E and the lateral acceleration in the simulation results of the comparative example of FIG. 22E, it is understood that, in this embodiment, the lateral accelerations at the time t1 and the time t3 are controlled in a specified range.

Note that, with regard to the correction of the rotation center azimuth, another correction method is conceived, in which the low-pass filter or the change rate limiter is applied for the fundamental value θ0 of the rotation center azimuth.

Figure 8:
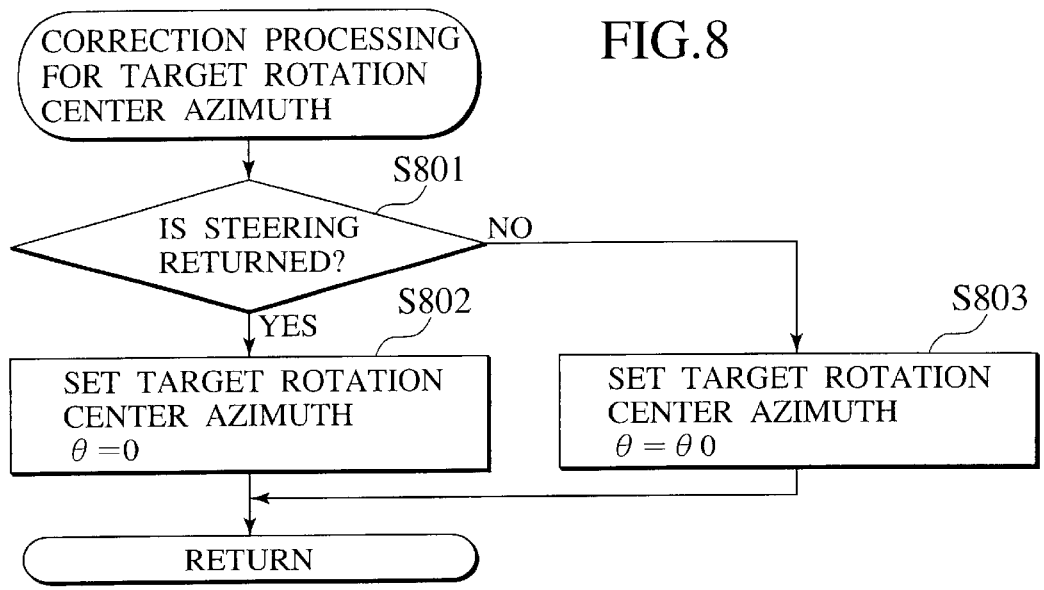
FIG. 8 is a flowchart showing a third embodiment of the correction operation for the rotation center azimuth.

A flowchart of FIG. 8 shows a third embodiment of the correction of the rotation center azimuth, which corresponds to the invention according to claim 4.

In Step S801, determination is made as to whether or not the steering wheel manipulation is in a return state based on whether dSTV is positive or negative. In the case of the steering return state, the operation proceeds to Step S802, and in the case of the steering increase state, the operation proceeds to Step S803.

In Step S802, the rotation center azimuth θ is set at 0.

In Step S803, the rotation center azimuth θ is set at the fundamental value θ0.

Simulation results of the third embodiment described with reference to the flowchart of FIG. 8 are shown in time charts of FIGS. 27A to 29.

Figure 19A:
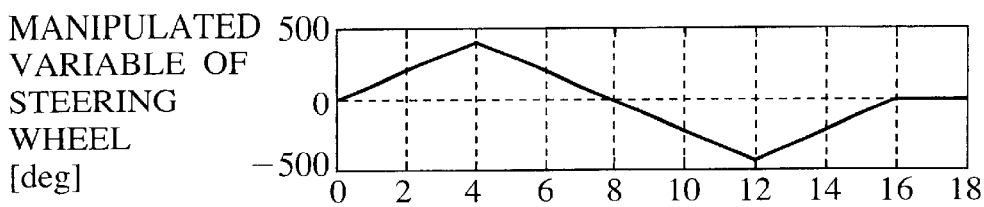
FIGS. 19A to 19E are time charts showing simulation results in a case of carrying out parallel parking in a forward motion by front-wheel steering.
Figure 19B:
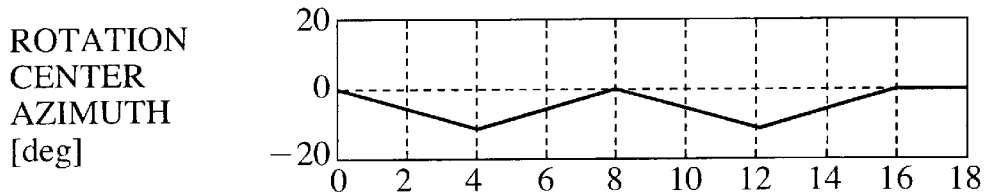
Figure 19C:
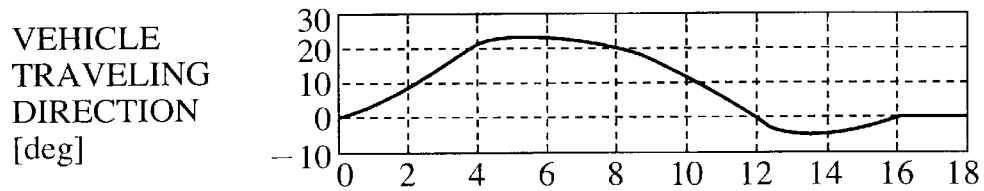
Figure 19D:
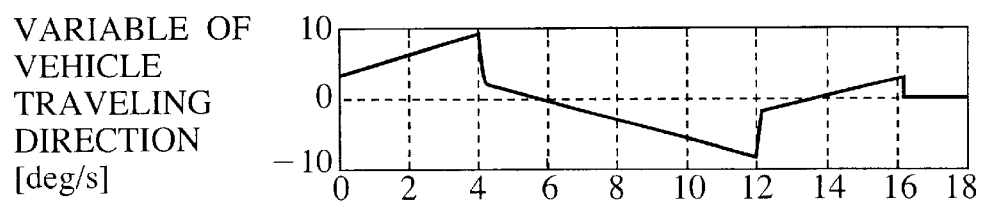
Figure 19E:
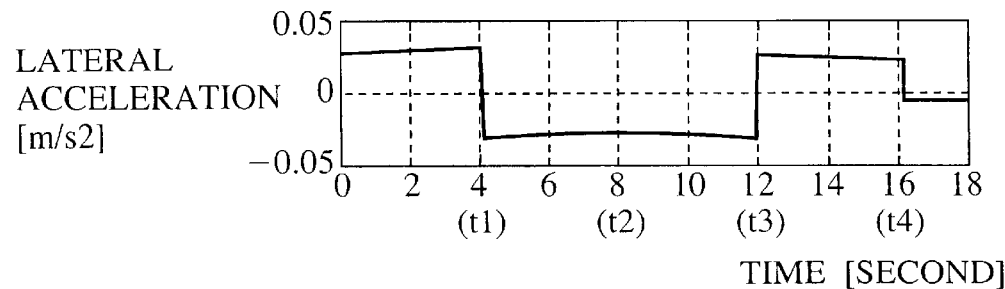
Figure 20:
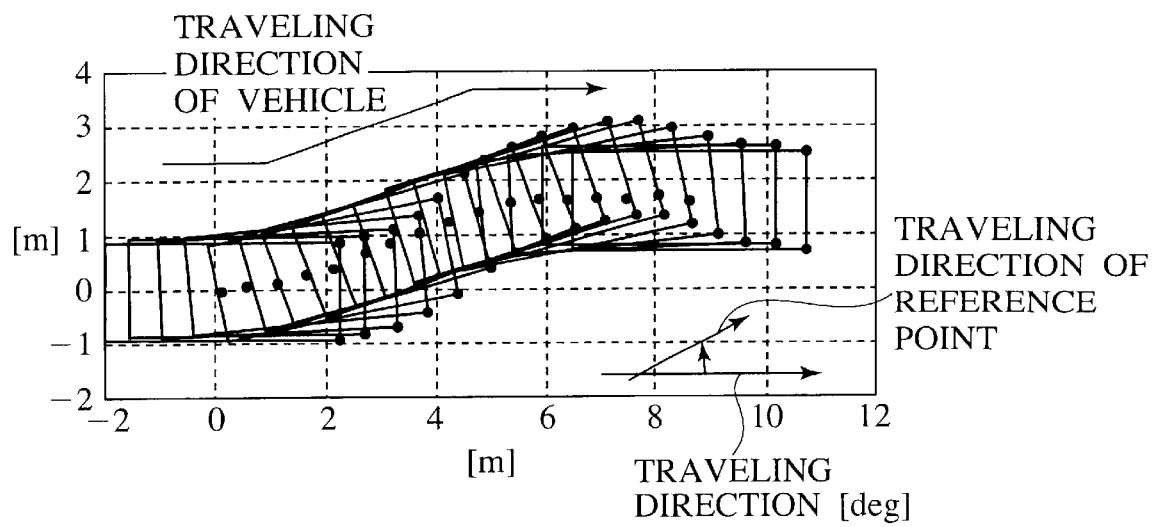
FIG. 20 is a view of a vehicle orbit, showing a simulation result in the case of carrying out the parallel parking in the forward motion by the front-wheel steering.
Figure 21:
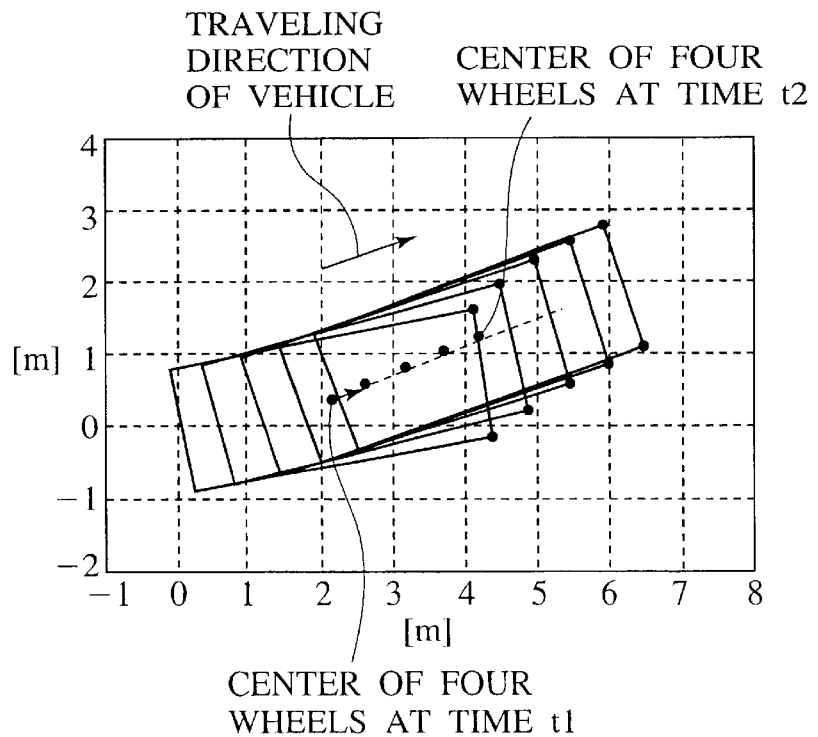
FIG. 21 is a view of the vehicle orbit, showing the simulation result in the case of carrying out the parallel parking in the forward motion by the front-wheel steering.
Figure 22A:
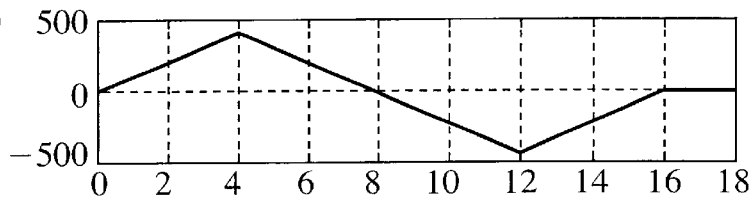
FIGS. 22A to 22E are time charts showing simulation results in a case of carrying out the parallel parking in the forward motion by executing the steering control for the front and rear wheels.
Figure 22B:
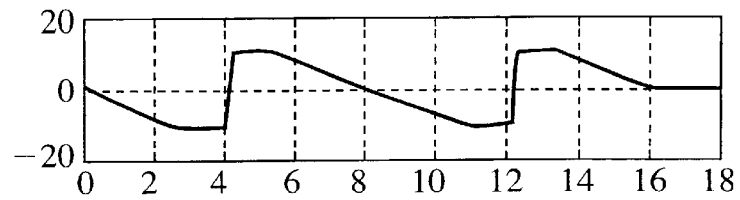
Figure 22C:
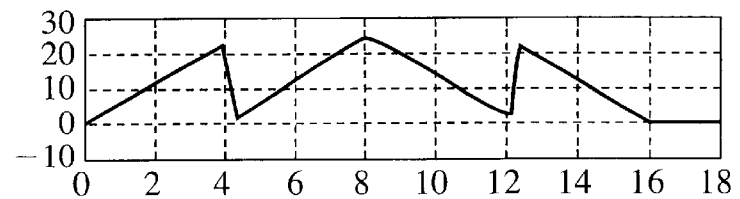
Figure 22D:
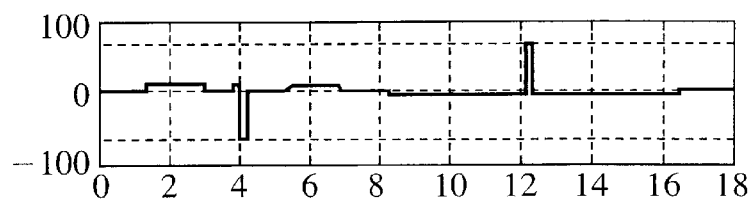
Figure 22E:
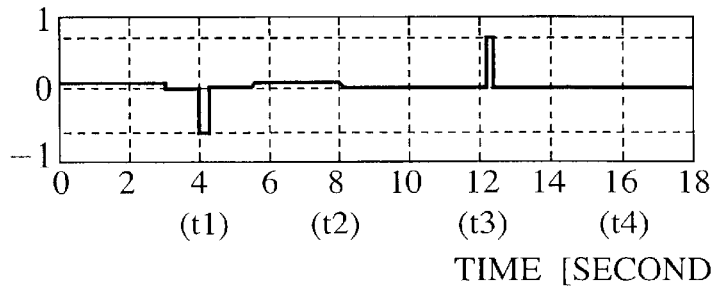
Figure 27A:
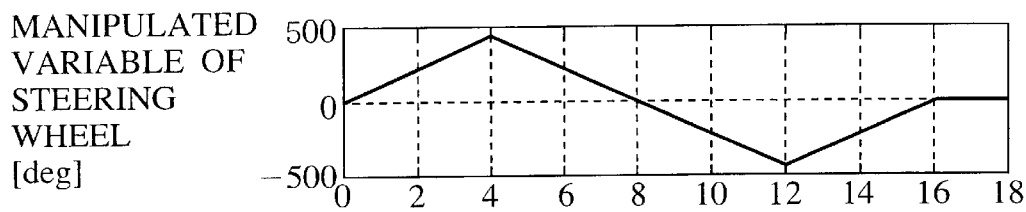
FIGS. 27A to 27E are time charts showing simulation results in a case of carrying out the parallel parking in the forward motion by executing the third embodiment of the present invention.
Figure 27B:
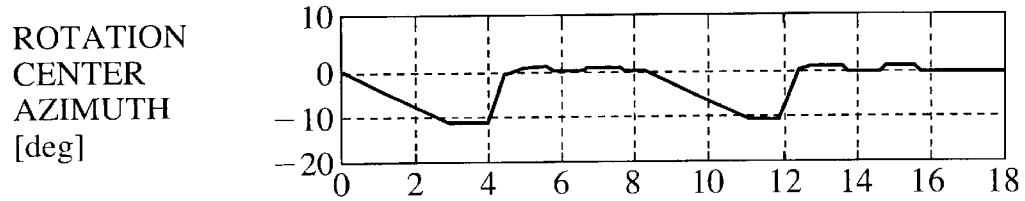
Figure 27C:
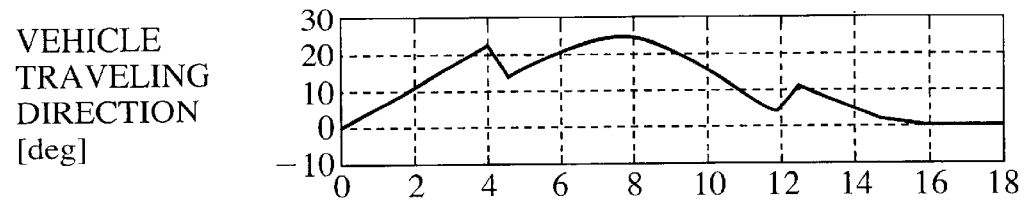
Figure 27D:
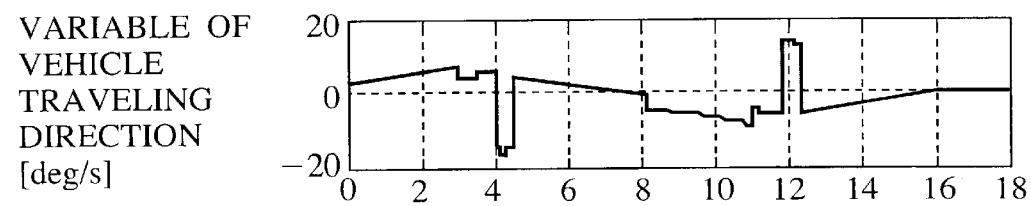
Figure 27E:
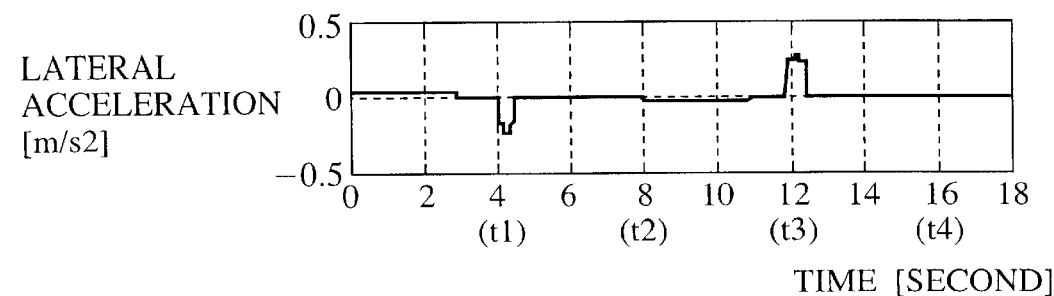

When a comparison is made between the vehicle traveling direction of FIG. 27D and the vehicle traveling direction in the simulation results of the comparative example of FIG. 22D, it is understood that, in this embodiment, values more approximate to the vehicle traveling direction (FIG. 19D) of the front wheel steering are taken during the steering increase from the time t1 to the time t2 and from the time t3 to the time t4.

Figure 24:
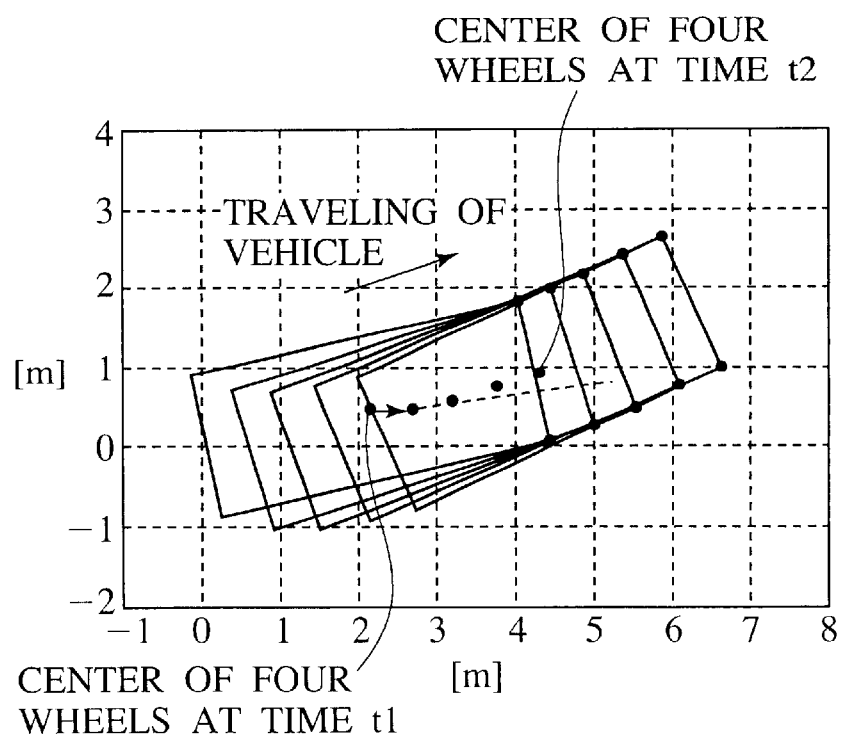
FIG. 24 is a view of the vehicle orbit, showing the simulation result in the case of carrying out the parallel parking in the forward motion by executing the steering control for the front and rear wheels.
Figure 25A:
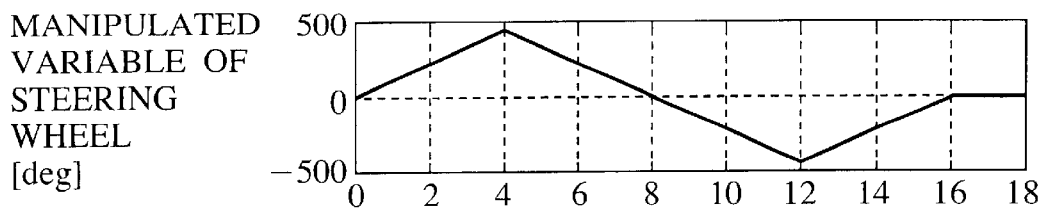
FIGS. 25A to 25E are time charts showing simulation results in a case of carrying out the parallel parking in the forward motion by executing the first embodiment of the present invention.
Figure 25B:
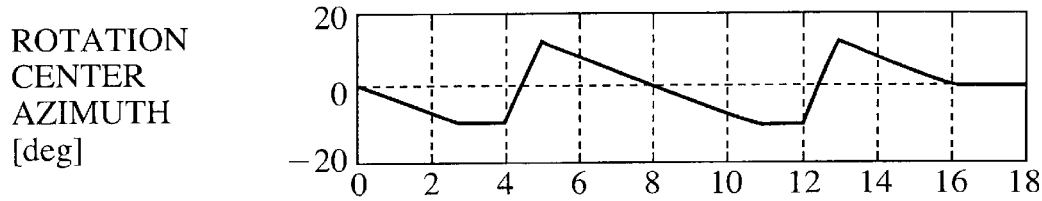
Figure 25C:
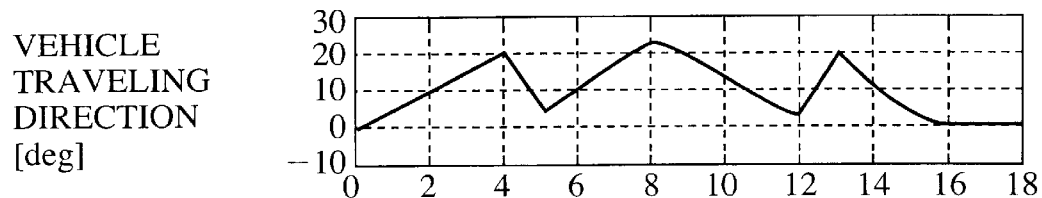
Figure 25D:
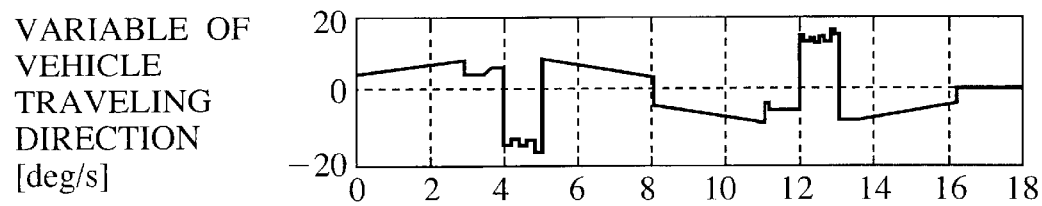
Figure 25E:
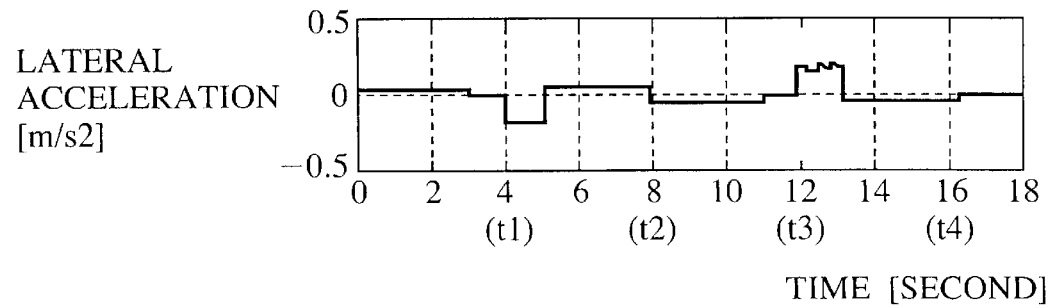
Figure 26A:
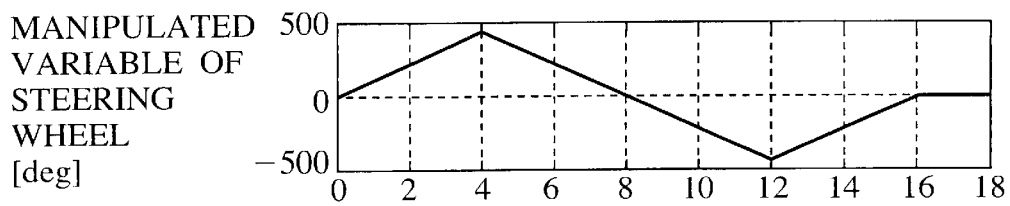
FIGS. 26A to 26E are time charts showing simulation results in a case of carrying out the parallel parking in the forward motion by executing the second embodiment of the present invention.
Figure 26B:
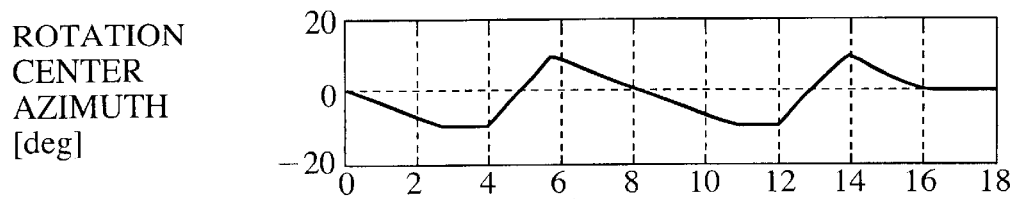
Figure 26C:
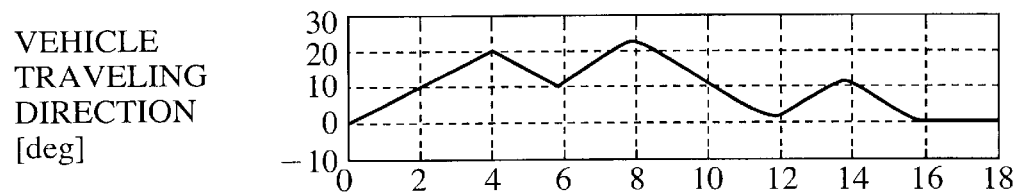
Figure 26D:
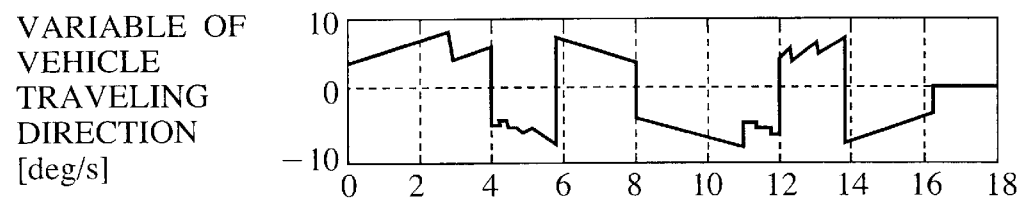
Figure 26E:
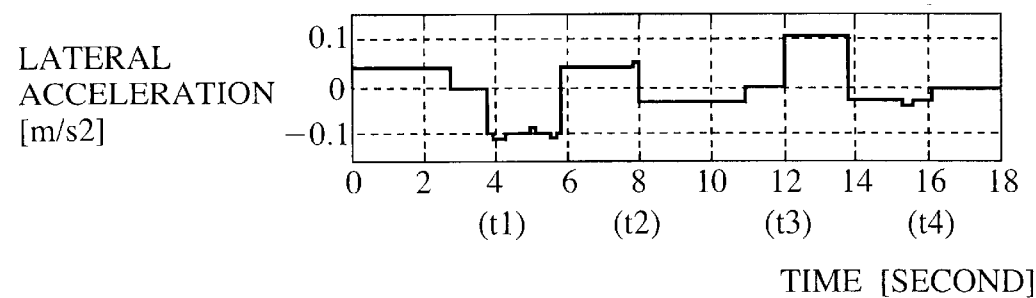
Figure 29:
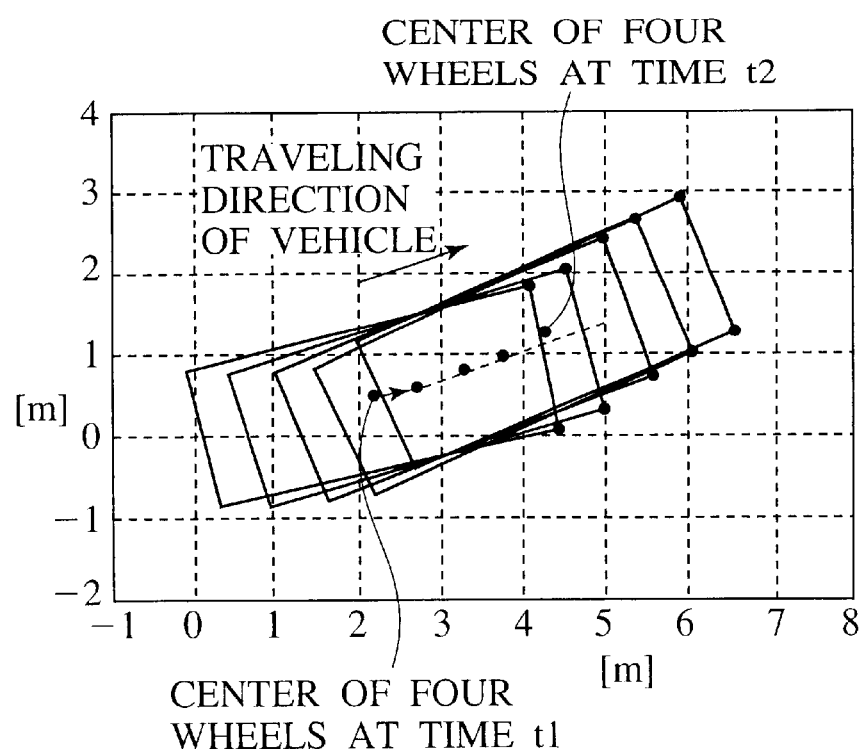
FIG. 29 is a view of the vehicle orbit, showing a simulation result in the case of carrying out the parallel parking in the forward motion by executing the third embodiment of the present invention.

Moreover, when viewing a vehicle orbit from the time t1 to the time t2, which is shown in FIG. 29, it is understood that a phenomenon that the vehicle travels in the left direction does not occur, which is as viewed in the comparative example shown in FIG. 24.

Figure 23:
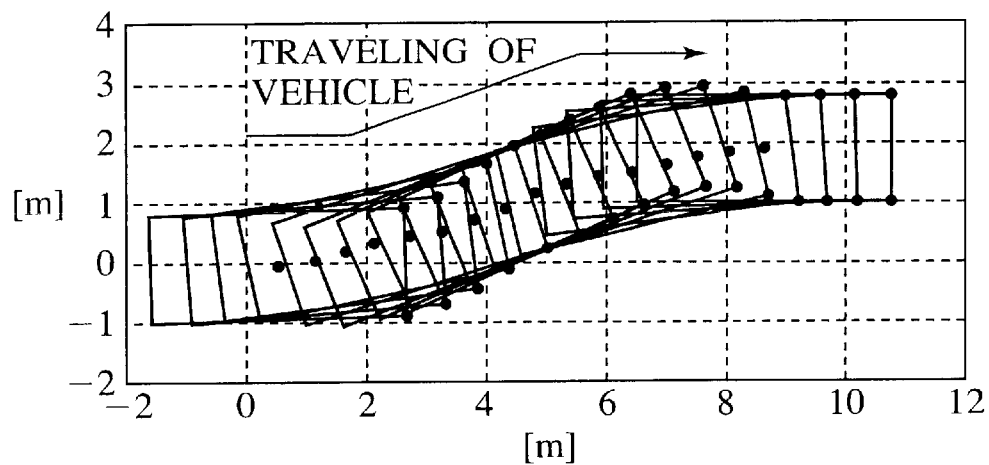
FIG. 23 is a view of the vehicle orbit, showing a simulation result in the case of carrying out the parallel parking in the forward motion by executing the steering control for the front and rear wheels.
Figure 28:
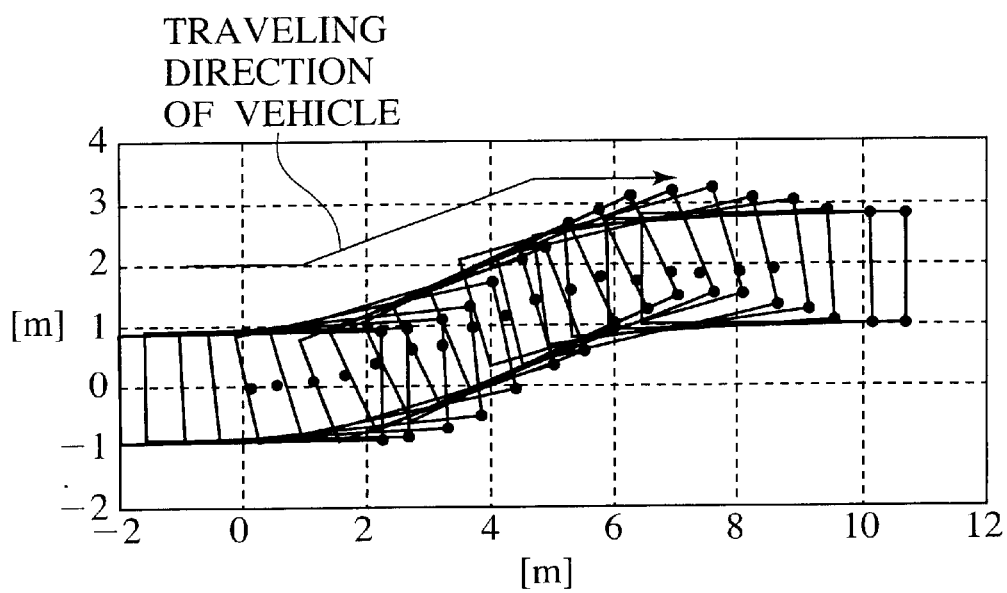
FIG. 28 is a view of the vehicle orbit, showing a simulation result in the case of carrying out the parallel parking in the forward motion by executing the third embodiment of the present invention.

Meanwhile, when viewing the vehicle orbit shown in FIG. 28, the swing of the front left portion of the vehicle is larger as compared with the comparative example shown in FIG. 23.

Figure 9:
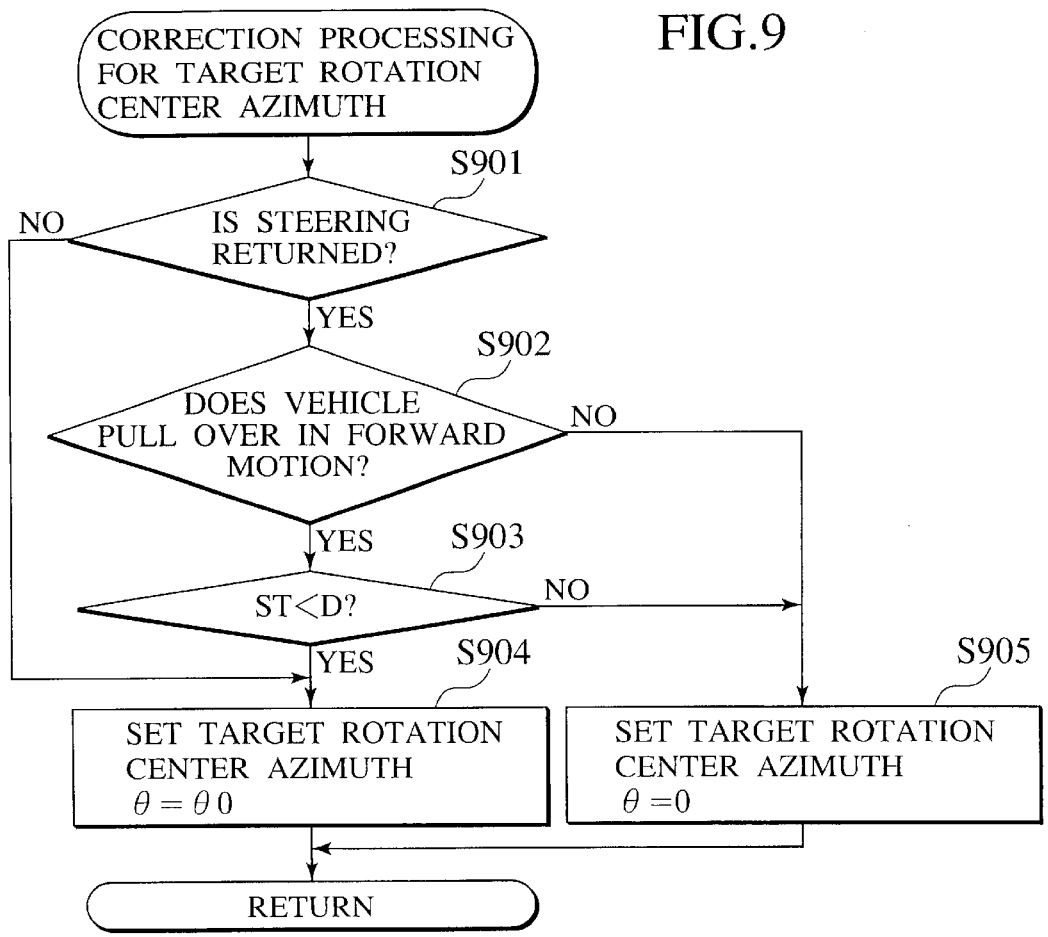
FIG. 9 is a flowchart showing a fourth embodiment of the correction operation for the rotation center azimuth.

A flowchart of FIG. 9 shows a fourth embodiment of the correction of the rotation center azimuth, which corresponds to the invention according to claim 5.

In Step S901, determination is made as to whether or not the steering wheel manipulation is in the return state based on whether dSTV is positive or negative. In the case of the steering return state, the operation proceeds to Step S902, and in the case of the steering increase state, the operation proceeds to Step S904.

In Step S902, determination is made as to whether or not the vehicle is in a state of pulling over to the shoulder of a road in the forward motion. As a method of this determination, there is a method of determining a state where the vehicle pulls over to the shoulder of the road in the forward motion, in which a switch is provided in a driver's seat and the driver manipulates the switch. Moreover, there is also a method of determining the state where the vehicle pulls over in the forward motion, in which a navigation system is provided in the vehicle, and when determination is made that a current vehicle position is not in the vicinity of an intersection by means of map information of the navigation system and that the vehicle speed is not more than a specified value (for example, 10 [km/h] or lower), the steering wheel manipulation toward the direction of the shoulder of the road is started.

In such a manner as described above, when determination is made that the vehicle is in the state of pulling over in the forward motion, the operation proceeds to Step S903, and when determination is made that the vehicle is not in the state of pulling over in the forward motion, the operation proceeds to Step S905.

In Step S903, determination is made as to whether or not the manipulated variable of the steering wheel is on the side of the road shoulder with respect to a neutral position. In the case where traffic is on the left side, when the manipulated variable of the steering wheel is on the right side with respect to the neutral position, the operation proceeds to Step S904, and when the steering wheel is on the left side, the operation proceeds to Step S905.

In Step S904, the rotation center azimuth θ is set at the fundamental value θ0.

In Step S905, the rotation center azimuth θ is set at 0.

Simulation results of the fourth embodiment described with reference to the flowchart of FIG. 9 are shown in FIGS. 30A to 32.

Figure 30A:
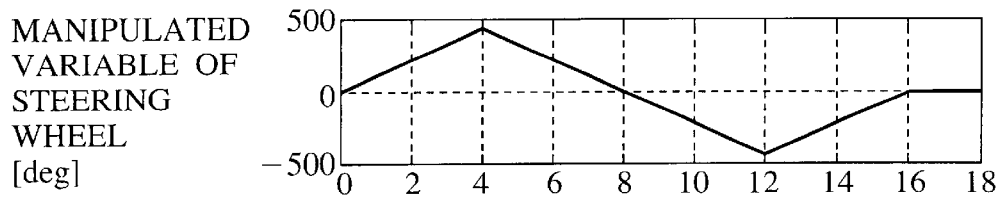
FIGS. 30A to 30E are time charts showing simulation results in a case of carrying out the parallel parking in the forward motion by executing the fourth embodiment of the present invention.
Figure 30B:
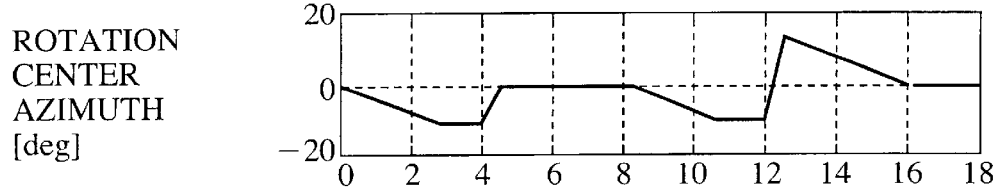
Figure 30C:
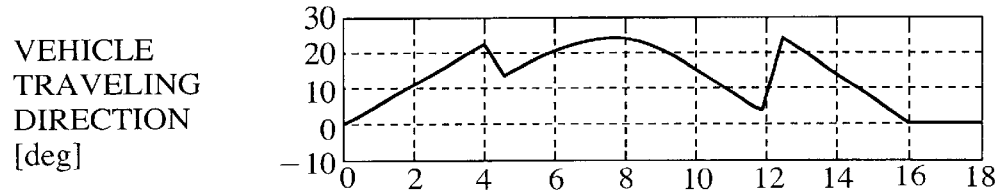
Figure 30D:
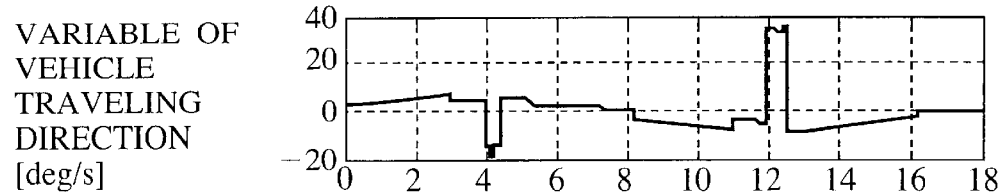
Figure 30E:
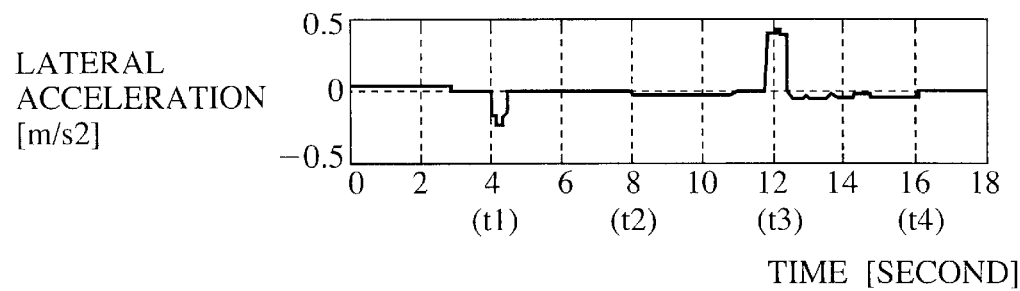

When a comparison is made between the vehicle traveling direction of FIG. 30D and the vehicle traveling direction in the simulation results of the comparative example of FIG. 22D, it is understood that, in this embodiment, values more approximate to the vehicle traveling direction (FIG. 19D) of the front wheel steering are taken during the steering increase from the time t1 to the time t2.

Figure 32:
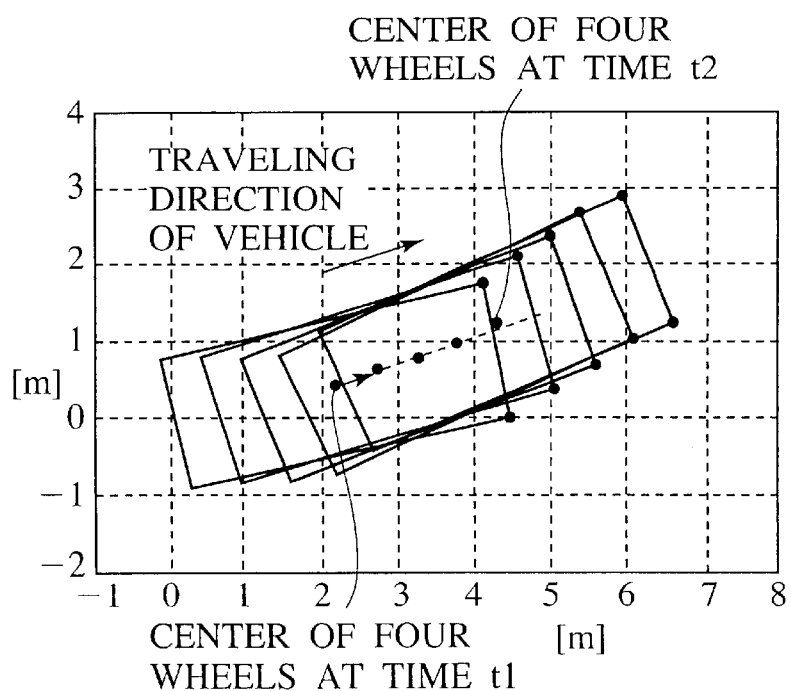
FIG. 32 is a view of the vehicle orbit, showing a simulation result in the case of carrying out the parallel parking in the forward motion by executing the fourth embodiment of the present invention.

Moreover, when viewing a vehicle orbit from the time t1 to the time t2, which is shown in FIG. 32, it is understood that a phenomenon that the vehicle travels in the left direction does not occur, which is as viewed in FIG. 24.

Figure 31:
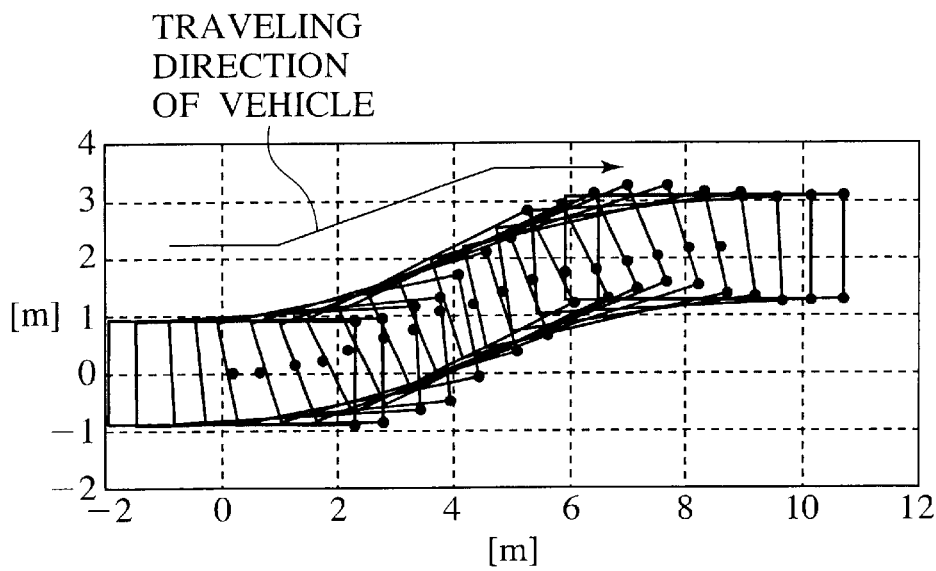
FIG. 31 is a view of the vehicle orbit, showing a simulation result in the case of carrying out the parallel parking in the forward motion by executing the fourth embodiment of the present invention.

Furthermore, when viewing the vehicle orbit shown in FIG. 31, it is understood that the swing of the front left portion of the vehicle is suppressed as compared with the vehicle orbit shown in FIG. 23. Moreover, as compared with the third embodiment, it is understood that a swing of the front end of the vehicle is suppressed.

In Step S404, operations are made for a radius R from the rotation center and a rotation center azimuth θ for specifying a target rotation center (point Q). Description will be made for this operation example with reference to a flowchart shown in FIG. 10.

Figure 10:
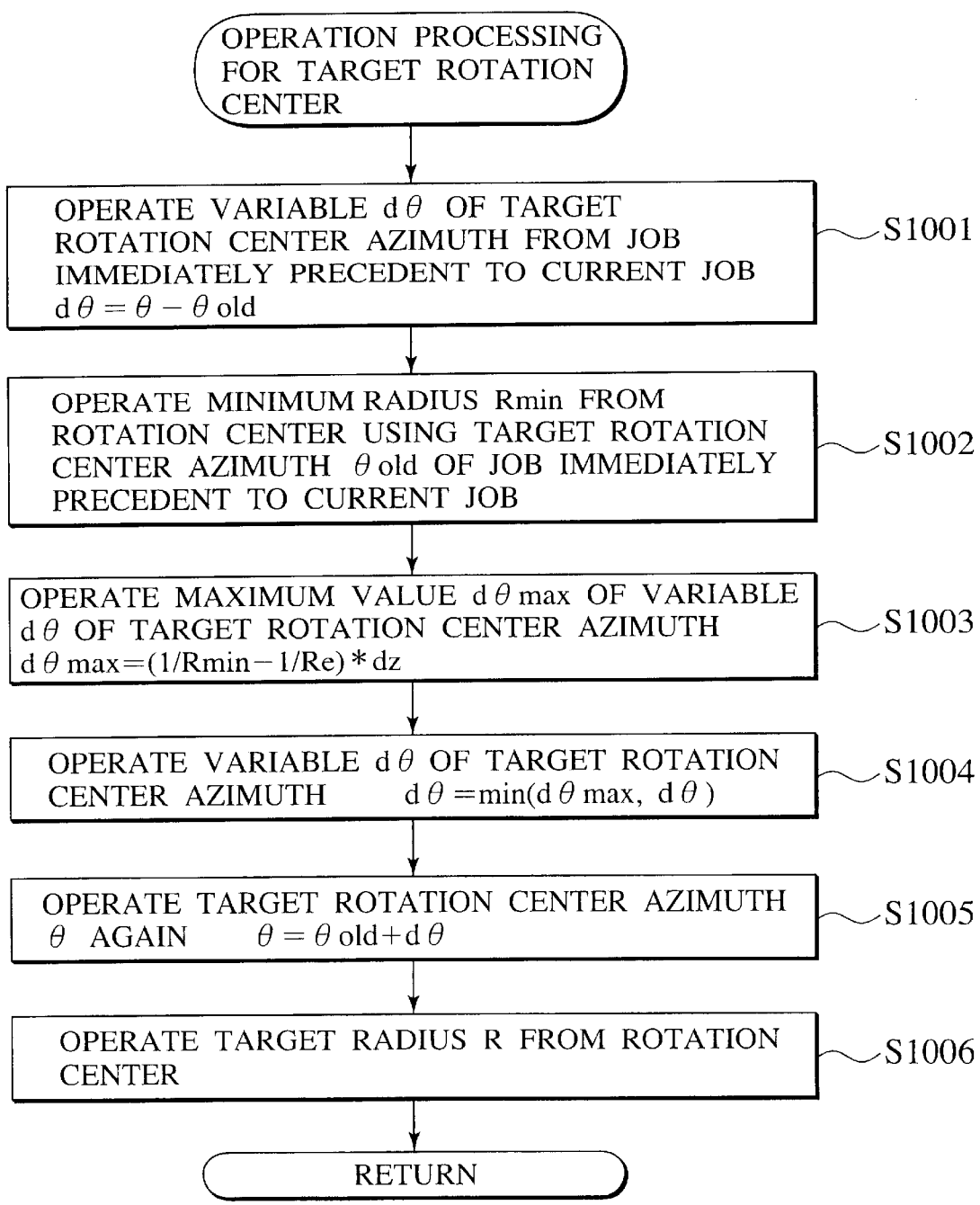
FIG. 10 is a flowchart showing an operation example for a target rotation center.

In the flowchart of FIG. 10, the operation is executed in synchronization with the pulse rise of the wheel speed sensor of the front right wheel when the vehicle turns to the left, and the operation is executed in synchronization with the pulse rise of the wheel speed sensor of the front left wheel when the vehicle turns to the right or travels approximately straight.

In Step S1001, a target rotation center azimuth dθ from a JOB immediately precedent to the current JOB is obtained from the target rotation center azimuth θ and a rotation center azimuth θold which has been operated in Step S1006 at the JOB immediately precedent to the current JOB, in the equation (12).

$$d\theta = \theta - \theta old \tag{12}$$

Figure 14:
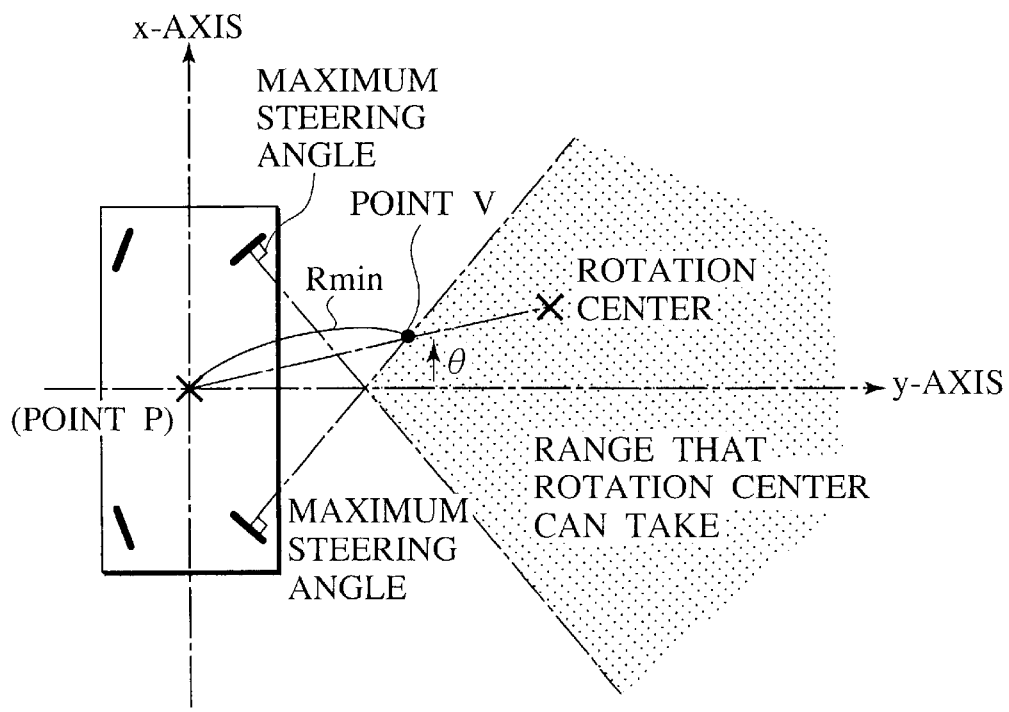
FIG. 14 is a view explaining a range which the rotation center can take, showing the vehicle seen from the above when the vehicle turns to the right.

In Step S1002, the minimum radius Rmin from the rotation center, which is realizable at the current time, is operated from the rotation center azimuth θold at the time point of the JOB immediately precedent to the current JOB. In FIG. 14, a point V shows a position that the closest rotation center from the reference point P on the vehicle can take in a direction of the rotation center azimuth θ. The realizable minimum radius R from the rotation center, which is described above, is a distance between the point V and the reference point P on the vehicle. The realizable minimum radius R from the rotation center can be operated in such a manner that Rmin values are previously measured as table data with respect to θ experimentally, the table data is stored in the ROM, and the table is looked up.

In Step S1003, the maximum value of changes dθ of the rotation center azimuth as capable of realizing the target turning radius Re is operated in the following equation, in consideration of the minimum value Rmin of the radius from the rotation center.

$$d\theta max = (1/Rmin - 1/Re) * dz \qquad (13)$$

In Step S1004, the changes dθ of the rotation center azimuth are limited by the maximum value obtained.

In Step S1005, the final rotation center azimuth θ is operated from the changes dθ of the rotation center azimuth.

Figure 18:
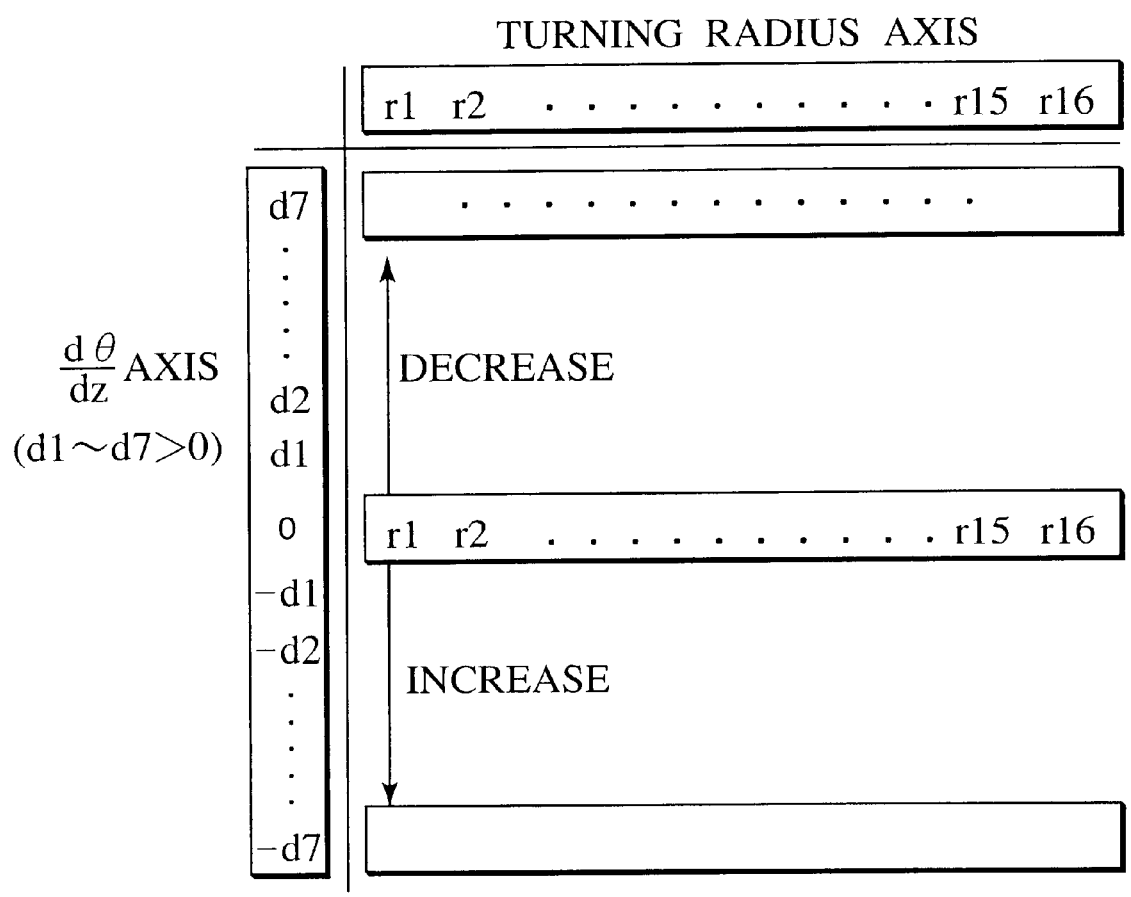
FIG. 18 is a view explaining a three-dimensional map for operating a radius from the rotation center.

Finally, in Step S1006, the radius R from the rotation center is operated based on the target turning radius Re and the variable dθ/dz of the rotation center azimuth. This operation is carried out by use of a three-dimensional map data. This map data is prepared in such a manner that the radius R from the rotation center and the variable dθ/dz of the rotation center azimuth are changed in an actual vehicle to experimentally measure actual turning radiuses Re in the respective phases of the change, and based on the measurement results, the turning radius Re and the variable dθ/dz of the rotation center azimuth are set as two input axes. For example, this map data is the one as shown in FIG. 18.

In the target steering angle operation in Step S405, the target steering angles of the respective wheels from the target rotation center (point Q) are operated. The target steering angles are denoted by δfl* (front left wheel), δfr* (front right wheel), δrl* (rear left wheel) and δrr* (rear right wheel). This operation example will be explained.

Relationships between the respective steering wheel angles and the rotation center when the steering angles of the respective wheels (front left wheel: δfl, front right wheel: δfr, rear left wheel: δrl and rear right wheel: δrr) are changed respectively in adjustable ranges are previously obtained experimentally.

Figure 17:
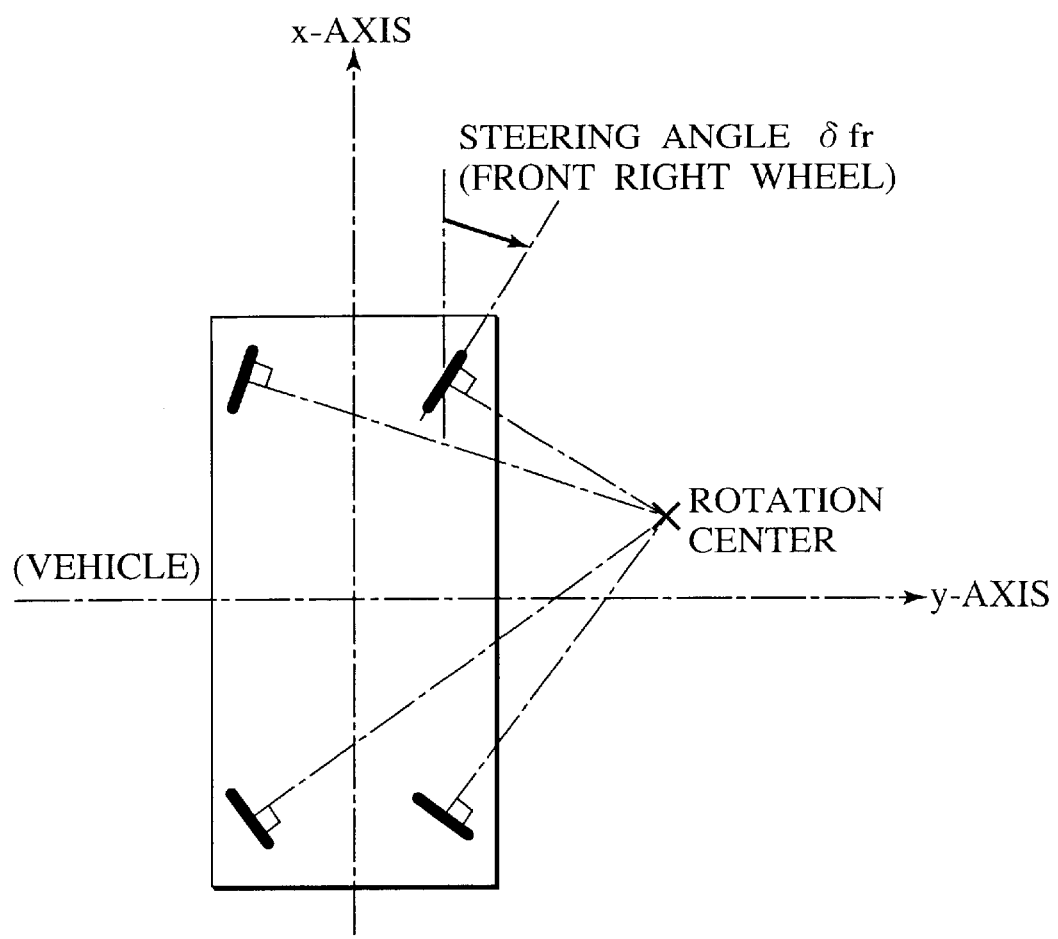
FIG. 17 is a view explaining an operation method for the steering angles of the respective wheels, showing the vehicle seen from the above when the vehicle turns to the right.

In this case, the rotation center is uniquely decided for the steering angles of the four wheels. On the contrary, when the rotation center is fixed, combinations of the steering angles of the four wheels are not uniquely decided, and degrees of freedom in combination exist. Accordingly, in the degrees of freedom, the steering angles of the respective wheels, which are approximate to combinations in the case of deciding the steering angles of the respective wheels so that, as shown in FIG. 17, segments connecting the respective wheels and the rotation center can be perpendicular to directions of the respective wheels, are made to correspond to the rotation center.

However, when the rotation center is sufficiently apart from the vehicle (when the vehicle travels approximately straight), combinations are selected, which realize toe-in keeping stability of the vehicle on straight running sufficiently, and the steering angles are made to correspond to the rotation center. The steering angles are made to correspond to the rotation center in such a manner as described above, whereby running resistance is reduced when the vehicle runs at a low speed, and energy required for running can be suppressed. Moreover, since slip angles of the tires of the respective wheels are also reduced, an effect of suppressing a slip sound of the tires is also obtained.

As described above, the data is stored in the ROM, in which the steering angles of the respective wheels (front left wheel: δfl, front right wheel: δfr, rear left wheel: δrl and rear right wheel: δrr) are made to correspond to the rotation center in the range that can be taken, and the data is looked up, whereby the target steering angles (front left wheel: δfl*, front right wheel: δfr*, rear left wheel: δrl* and rear right wheel: δrr*) of the respective wheels with respect to the target rotation center point Q are operated. Here, since the rotation center is also changed in response to the vehicle speed as well as to the steering angles of the respective wheels, it is far better if an influence thereof (i.e., change of the rotation center due to the vehicle speed) is previously obtained experimentally to be stored as data in the ROM, and the data is also looked up for the vehicle speed.

In the steering angle control in Step S406, current command values are operated, which command the DC motors of the respective wheel steering actuators 5 to 8 from the drive circuits 20 to 23 so that the steering angles of the respective wheels (front left wheel: δfl, front right wheel: δfr, rear left wheel: δrl and rear right wheel: δrr) coincide with the target steering angles (front left wheel: δfl*, front right wheel: δfr*, rear left wheel: δrl* and rear right wheel: δrr*).

Here, relationships between detection values of the respective rack stroke sensors 31 to 34 and the steering angles of the respective wheels are previously obtained experimentally, and data thus related is previously stored in the ROM and looked up, thus steering angle detection values of the respective wheels are operated from the detection values of the rack stroke sensors 31 to 34.

The current command values are subjected to feedback operation so that the steering angle detection values of the respective wheels can coincide with the target steering angles. As methods of the feedback operation, there are PID control, sliding mode control, model reference type control, and the like. Since all of the above-described methods are well known in general, detailed descriptions thereof will be omitted here.

Japanese Patent Application No. 2001-179544, file on Jun. 14, 2001, is expressly incorporated herein by reference in its entirety.

What is claimed is:

1. An apparatus for controlling steering angles of front and rear wheels of a vehicle, in which the steering angles of the front and rear wheels are controlled independently, the apparatus comprising:

a target steering angle operation unit configured to operate target steering angles of the front and rear wheels based on a manipulated variable of a steering wheel;

a steering increase/steering return determination unit configured to determine as to whether steering is in an increase state where a direction of steering wheel manipulation and a direction changed thereby coincide with each other or in a return state where the direction of steering wheel manipulation and the direction changed thereby contradict each other;

a target rotation center azimuth operation unit configured to operate a target rotation center azimuth to reduce a rotation center azimuth when the steering increase/steering return determination unit determines the steering increase state and to operate the target rotation center azimuth to increase the rotation center azimuth when the steering increase/steering return determination unit determines the steering return state;

a vehicle behavior estimation unit configured to estimate a vehicle behavior based on the target rotation center azimuth;

a corrected target rotation center azimuth operation unit configured to operate a corrected target rotation center azimuth by limiting the target rotation center azimuth so that the estimated vehicle behavior does not exceed a specified range;

a corrected target steering angle operation unit configured to operate a corrected target steering angle by correcting the target steering angle so as to realize the corrected target rotation center azimuth; and a steering angle adjustment unit configured to adjust each of the steering angles of the front and rear wheels of the vehicle so as to realize the corrected target steering angle.

2. The apparatus for controlling steering angles of front and rear wheels of a vehicle according to claim 1, wherein the vehicle behavior estimation unit is an angle variable estimation unit of a vehicle traveling direction, the angle variable estimation unit estimating an angle variable of a traveling direction of a reference point on the vehicle with respect to a ground, based on the target rotation center azimuth, and the corrected target rotation center azimuth operation unit operates the corrected target rotation center azimuth by limiting the target rotation center azimuth so that the angle variable of the traveling direction of the vehicle does not exceed a specified upper limit value.

3. The apparatus for controlling steering angles of front and rear wheels of a vehicle according to claim 1, wherein the vehicle behavior estimation unit is a vehicle lateral acceleration estimation unit configured to estimate a lateral acceleration of the reference point on the vehicle based on the target rotation center azimuth, and the corrected target rotation center azimuth operation unit operates the corrected target rotation center azimuth by limiting the target rotation center azimuth so that the lateral acceleration does not exceed the specified upper limit value.

4. The apparatus for controlling steering angles of front and rear wheels of a vehicle according to claim 1, wherein the vehicle behavior estimation unit includes:
a vehicle traveling direction estimation unit configured to estimate the traveling direction of the reference point on the vehicle with respect to the ground, based on the target rotation center azimuth; and a vehicle traveling direction estimation unit during front wheel steering, the vehicle traveling direction estimation unit estimating the traveling direction of the reference point on the vehicle with respect to the ground in a case of steering only the front wheels, based on the manipulated variable of the steering wheel, and the corrected target rotation center azimuth operation unit operates the corrected target rotation center azimuth based on the estimated vehicle traveling direction and the estimated vehicle traveling direction during the front wheel steering by limiting the target rotation center azimuth so that the vehicle traveling direction is close to the vehicle traveling direction during the front wheel steering.

5. The apparatus for controlling steering angles of front and rear wheels of a vehicle according to claim 4, further comprising:

a forward motion-pulling over detection unit configured to detect a state where the vehicle pulls over to a shoulder of a road in a forward motion;

a steering wheel manipulation direction detection unit configured to detect a direction where the manipulated variable of the steering wheel is close to the shoulder with respect to a neutral position; and a target rotation center azimuth limit permission unit configured to permit a limit to the target rotation center azimuth only when the state where the vehicle pulls over to the shoulder of the road in the forward motion is detected in the forward motion-pulling over detection unit and when the direction where the manipulated variable of the steering wheel is close to the shoulder with respect to the neutral position is detected in the steering wheel manipulation direction detection unit, wherein, when the limit to the target rotation center azimuth is permitted in the target rotation center azimuth limit permission unit, the corrected target rotation center azimuth operation unit operates the corrected target rotation center azimuth based on the vehicle traveling direction and the vehicle traveling direction during the front wheel steering by limiting the target rotation center azimuth so that the vehicle traveling direction is close to the vehicle traveling direction during the front wheel steering.

6. An apparatus for controlling steering angles of front and rear wheels of a vehicle, in which the steering angles of the front and rear wheels are controlled independently, the apparatus comprising:

target steering angle operation means for operating target steering angles of the front and rear wheels based on a manipulated variable of a steering wheel;

steering increase/steering return determination means for determining as to whether steering is in an increase state where a direction of steering wheel manipulation and a direction changed thereby coincide with each other or in a return state where the direction of steering wheel manipulation and the direction changed thereby contradict each other;

target rotation center azimuth operation means for operating a target rotation center azimuth to reduce a rotation center azimuth when the steering increase/steering return determination unit determines the steering increase state and for operating the target rotation center azimuth to increase the rotation center azimuth when the steering increase/steering return determination unit determines the steering return state;

vehicle behavior estimation means for estimating a vehicle behavior based on the target rotation center azimuth;

corrected target rotation center azimuth operation means for operating a corrected target rotation center azimuth by limiting the target rotation center azimuth so that the estimated vehicle behavior does not exceed a specified range;

corrected target steering angle operation means for operating a corrected target steering angle by correcting the target steering angle so as to realize the corrected target rotation center azimuth; and steering angle adjustment means for adjusting each of the steering angles of the front and rear wheels of the vehicle so as to realize the corrected target steering angle.

* * * * *